US 7,152,116 B1

(12) United States Patent
Austin et al.

(10) Patent No.: US 7,152,116 B1
(45) Date of Patent: Dec. 19, 2006

(54) SYSTEM AND METHOD FOR AUTOMATICALLY CREATING URLS FOR ACCESSING DATA SOURCES AND DATA TARGETS

(75) Inventors: Paul Austin, Austin, TX (US); David Fuller, Austin, TX (US); Kurt M. Carlson, Austin, TX (US); Chris Mayer, Austin, TX (US); Stephen Rogers, Austin, TX (US); Joe Savage, Cedar Park, TX (US); Brian Sierer, Austin, TX (US)

(73) Assignee: National Instruments Corporation, Austin, TX (US)

(*) Notice: Subject to any disclaimer, the term of this patent is extended or adjusted under 35 U.S.C. 154(b) by 866 days.

(21) Appl. No.: 09/374,740

(22) Filed: Aug. 13, 1999

Related U.S. Application Data

(60) Provisional application No. 60/097,593, filed on Aug. 24, 1998.

(51) Int. Cl.
*G06F 15/16* (2006.01)
(52) U.S. Cl. .................................................. 709/245
(58) Field of Classification Search .................... 710/9; 709/245, 212, 220, 222
See application file for complete search history.

(56) References Cited

U.S. PATENT DOCUMENTS

| | | | |
|---|---|---|---|
| 5,913,028 A * | 6/1999 | Wang et al. | 709/203 |
| 5,978,817 A | 11/1999 | Giannandrea et al. | |
| 6,047,332 A * | 4/2000 | Viswanathan et al. | 709/245 |
| 6,091,409 A * | 7/2000 | Dickman et al. | 345/329 |
| 6,094,684 A | 7/2000 | Pallmann | |
| 6,370,569 B1 * | 4/2002 | Austin | 709/217 |

OTHER PUBLICATIONS

Kaiser et al., An Architecture for WWW-based Hypercode Environments, ACM document No. 0-89791-914-9/97/05, 1997.*

* cited by examiner

*Primary Examiner*—Glenton B. Burgess
*Assistant Examiner*—Sean Reilly
(74) *Attorney, Agent, or Firm*—Meyertons Hood Kivlin Kowert & Goetzel, P.C.; Jeffrey C. Hood; Jason L. Burgess

(57) ABSTRACT

A system and method for automatically generating URLs which reference one or more data sources or data targets connected to a computer. The data sources/targets may be of any type including files, http servers, ftp servers, hardware devices, etc. The generated URLs may be used together with a system such as the Data Socket system to seamlessly read data from disparate data source types or write data to disparate data target types without having to manually perform configuration, connection operations, data format conversion, etc. The URLs are generated automatically and contain all the information necessary for accessing the data source/target. This greatly abstracts a user or application from the I/O process.

56 Claims, 12 Drawing Sheets

SYSTEM AND METHOD FOR AUTOMATICALLY CREATING URLS FOR ACCESSING DATA SOURCES AND DATA TARGETS

PRIORITY CLAIM

This application claims benefit of priority of U.S. provisional application Ser. No. 60/097,593 titled "Data Socket System and Method for Identifying, Configuring, and Connecting to Devices Using URLs" filed Aug. 24, 1998, whose inventors were Paul F. Austin, David W Fuller, Brian H. Sierer, Kurt Carlson, Stephen Rogers and Chris Mayer.

BACKGROUND OF THE INVENTION

1. Field of the Invention

The present invention relates to the field of computer input/output, and more particularly to a system and method for automatically generating URLs (Uniform Resource Locators) for configuring and accessing data sources and data targets. The data sources/targets may be of any type, including I/O devices, files, http servers, ftp servers, etc.

2. Description of the Related Art

In modern networked computer systems, the computer system may be required to obtain data from various sources or write data to various targets, including local memory on the computer system, external data sources connected to the computer system, such as I/O devices connected to computer system ports, and other networked computer systems, such as computer systems connected to a LAN, WAN or to the Internet. When a program executing on a computer system is required to access data, the program is often required to account for the source or location of the data, opening and closing of files, the format of the data, and conversion of the data to readable formats, among other tasks.

One of the biggest challenges in developing complex applications that are comprised of different components is sharing and exchanging information and data between the different components. Today, this task is solved using a number of different existing tools, including writing and reading files, DDE, ActiveX automation, http server and client tools, and more. In addition, measurement applications, as well as other engineering applications, often place some special requirements on sharing data, such as providing additional information qualifying the data.

Hence, an improved system and method is desired for providing programs with access to various data sources and targets having various types or formats, wherein the access is provided invisibly to the user or programmer. U.S. patent application Ser. No. 09/185,161 titled "Data Socket System and Method for Accessing Data Sources Using URLs" describes a component called a Data Socket and URLs called Data Socket URLs which work together for improved data access. In the above-referenced application, the Data Socket client addresses data sources and targets using a URL (Uniform Resource Locator), much the way that a URL is used to address web pages anywhere in the world. The application also describes new Data Socket URLs which allow the user to access I/O device data sources and targets. When reading from an input source, the Data Socket performs all work necessary to read the raw data from various input sources and to parse the data and return it in a form directly usable by the user's applications. When writing to an output target the Data Socket performs all work necessary to format the data provided by the user in the appropriate raw format for the specific target.

The Data Socket system and method described in the above-referenced application is general enough to access data from any type of data source or target, including I/O devices, files, http servers, ftp servers, etc. The URL contains all the information needed for the Data Socket system to access the data source/target. The URL contains all the information necessary to identify the type of data source/target, determine the address of the data source/target, and establish a connection with the data source/target. The URL may also contain configuration information that the Data Socket system uses to configure the data source/target. The user need only supply the appropriate URL to the Data Socket system.

However, given the unlimited range of data source or target types that may be accessed using this method, the task of generating the correct URL to access a specific data source/target in a specific way may be complicated. The capabilities and uses of different data source/target types vary greatly. For example, a DAQ device typically includes input and output analog/digital channels, counter/timers, and other DAQ-related parameters. On the other hand, another type of device may have an entirely different set of data source/target types and configuration parameters. Rather than force the user to learn the correct syntax for the data source/target of interest and manually generate a URL for the data source/target, it is desirable to have a system and method to automatically identify data sources/targets connected to a computer system and generate URLs for configuring and accessing them. For example, it may be desirable to have a system and method to automatically identify the hardware devices connected to a computer system and generate URLs for configuring and connecting to the data sources associated with the devices. As another example, it may be desirable to have a system and method to automatically identify files of a particular type and generate URLs which contain information for accessing and correctly reading from or writing to the files. The present invention is directed toward solving these problems.

SUMMARY OF THE INVENTION

The present invention provides a system and method to automatically identify the data sources and targets, e.g., hardware device I/O sources or targets, connected to a computer system and generate URLs for configuring and accessing them. The terms "data source" and "data target" are used in the present application in a broad sense to refer to any of various types of data sources/sinks that can be read from and/or written to, such as files, http servers, I/O devices, etc. The URLs generated by the present invention may be integrated with the computer operating system so that a user may easily access them and provide them to an application program. For example, in one embodiment, a user may drag and drop an icon representing a generated URL into an application program in which a Data Socket control has been included. The Data Socket system may then access the data source/target identified by the URL and return data from that source to the application program or pass data from the application program to the target.

The preferred embodiment comprises a software module referred to herein as the URL generation manager which manages the process of identifying data sources/targets connected to the computer system and generating URLs for each of them. The embodiment may further comprise plug-in modules for each type of data source/target which each communicate with the URL generation manager. For example, one plug-in module may be associated with DAQ devices, another may be associated with GPIB devices, and another may be associated with files or a particular type of file. The URL generation manager instructs each plug-in module to perform a process of identifying all the addressable data sources/targets associated with the plug-in type and generating a separate URL for each one. For example, for a system containing two DAQ boards with eight channels each, the DAQ plug-in module may generate sixteen separate URLs, one for each channel. Each of the plug-in modules may query a hardware database or other type of database, as appropriate to the plug-in type, to determine information regarding the data sources/targets, such as capabilities and configuration information. This information is then used in generating the URLs. The URL generation manager may then integrate the URLs generated by each plug-in with the computer operating system. For example, in one embodiment, the URLs are integrated into the user interface of the Windows Explorer tree through Windows shell extensions.

In the above description, the URL generation process involves generating a URL for each addressable data source or target connected to the computer. However, the process may also generate URLs for only a subset of the addressable data sources/targets. For example, in response to a new device being connected to the computer, it is possible that only the URLs for the data sources/targets of the new device are generated. Also, a user may specify a subset of the addressable data sources/targets for which to generate URLs.

The URL generation process may be initiated at system boot, or in response to a new device being connected to the computer, or in response to a user request, or in response to some other event or condition. For the case of hardware device data sources/targets, the URL generation manager is notified by the operating system of either all of, or a subset of, the connected devices, as appropriate to the situation triggering the URL generation process. In the preferred embodiment, this notification is accomplished by integrating the URL generation manager with the Plug & Play system of the operating system. For example, the Plug & Play system may notify the URL generation manager of a new device that has been connected to the computer, or the Plug & Play system may notify the URL generation manager of all the connected devices at system boot time. After such notification, the URL generation manager then initiates and manages the process of identifying the capabilities of the device(s) and generating URLs for the addressable data sources/targets of the device(s).

It is noted that the plug-ins responsible for generating URLs for the data sources/targets may include configuration information in the URLs that they generate. Thus, device configuration and software configuration capabilities are inherent in the system and method of the present invention. The present invention may also comprise utilities to edit the generated URLs or create new URLs if the user changes the default configuration information. These utilities would allow the user to change the configuration information contained in a URL without necessarily knowing the required syntax.

In the preferred embodiment, the URLs generated by the present invention are used in conjunction with the Data Socket system disclosed in U.S. patent application Ser. No. 09/185,161. As noted above, the Data Socket system performs all the work necessary to read from a data source or write to a data target identified by a URL, including the connection process, data conversion, etc. Together, the two inventions enable a user to access a data source or target while knowing virtually nothing about the data format of the data source/target or, in the case of device data sources/targets, the underlying device hardware or software.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

The following references are hereby incorporated by reference in their entirety as though fully and completely set forth herein.

U.S. patent application Ser. No. 09/185,161 titled "Data Socket System and Method for Accessing Data Sources Using URLs" filed Nov. 3, 1998, whose inventor was Paul F. Austin.

For general information on object oriented programming concepts, please see Booch, Object-Oriented Analysis and Design with Applications, The Benjamin/Cummings Publishing Company, Inc., 1994 which is hereby incorporated by reference in its entirety. For information on OLE Controls and COM interfaces, please see Microsoft OLE Control Developer's Kit, Microsoft Press, 1994 and Denning, OLE Controls Inside Out: The Programmer's Guide to Building Componentware with OLE and the Component Object Model, Microsoft Press, 1995 which are hereby incorporated by reference in their entirety.

Figure 1:
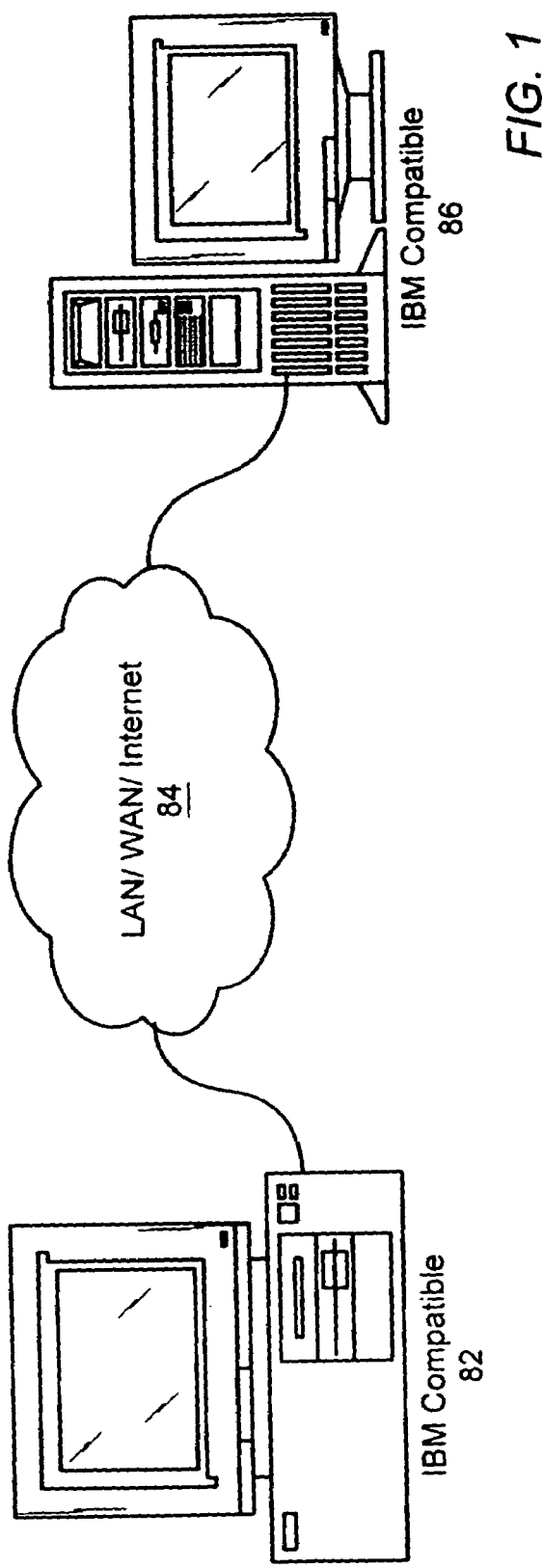
FIG. 1 illustrates a computer system connected through a network to a second computer system.

FIG. 1—Computer System Connected to a Network

FIG. 1 illustrates an exemplary computer network in which a computer system 82 is connected through a network 84 to a second computer system 86. The computer system 82 and the second computer system 86 can be any of various types, as desired. The network 84 can also be any of various types, including a LAN (local area network), WAN (wide area network), or the Internet, among others.

The computer system 82 includes or stores computer programs which automatically identify the data sources/targets, such as the addressable data sources/targets of I/O devices, connected to the computer system 82 or to another computer system 86, and generate URLs for configuring and connecting to the data sources/targets. Application programs executing in the computer system 82 are operable to use the URLs to access data located locally from the computer 82, or external to the computer 82, such as data sources/targets located in the second computer system 86 through the network 84. The URLs may also be provided to application programs executing in another computer system (not shown) to access data. The data may be stored and/or located in various manners. For example, the URLs may reference data located in the system memory or non-volatile memory of the computer 82 or another computer 86.

The present invention may be used to generate URLs for connecting to any of various data sources/targets. For example, the URLs may reference data stored in or generated by peripheral devices connected to the computer system 82, such as peripheral devices connected to the computer's serial port, e.g., the RS-232 port, RS-485 port, a USB (Universal Serial Bus) port, an IEEE 1394 port, an IEEE 1394.2 port, etc., or peripheral devices connected to the parallel port of the computer system 82. The URLs may also reference data stored in or generated by peripheral devices connected to a bus of the computer system 82, such as the PCI (Peripheral Component Interconnect) bus, the ISA (Industry Standard Architecture) bus, and the NuBus, among others. Examples of these peripheral devices include instrumentation devices, e.g., data acquisition (DAQ), GPIB, VXI, and PXI devices, industrial automation devices, process control devices, multimedia devices, e.g., video and/or audio devices, network adapters, etc. The URLs may also reference external peripheral devices such as a keyboard, mouse, display device, printer, etc. The URLs may also reference data sources/targets connected to the computer system 82 through the network 84, such as computer system 86 or addressable data sources/targets of peripheral devices connected to computer system 86. The URLs may also reference data from any other type of data source/target, such as files, http servers, ftp servers, media servers, or other data sources/targets.

Thus the URLs, together with a system enabled to use them, permit access to data stored locally on or proximate to the computer 82 as well as data stored in a computer or device 86 connected through any of various types of networks 84 to the computer 82. This data access is provided invisibly to the user, i.e., the user is not required to create program code to connect to the data source/target, or open or close files, or handle data format conversions, etc. The user is also not required to manually generate the URLs which reference the data since the present invention performs that task.

In the preferred embodiment, the URLs generated by the present invention are used together with the Data Socket system and method disclosed in U.S. patent application Ser. No. 09/185,161 to provide the described data access. However, it is noted that the present invention may be used to automatically generate URLs which may be used in conjunction with other types of systems or applications. As described in detail below, URLs are automatically generated by plug-in modules which identify addressable data sources/targets and generate URLs referencing them. Thus, as new types of data servers become available which use new forms of URLs, plug-in modules may be added to a system to automatically generate these new types of URLs. The generated URLs may be provided to any application enabled to use them (not necessarily a data socket-enabled application).

As an example, the present invention may be used to generate URLs for a media server, such as a streaming media server, used in delivering audio or video content. The URLs may be automatically generated to reference new audio or video files stored on the media server or on other media servers. For example, in a media server delivering on-line audio books, the media server may use its own proprietary transfer protocol and may use URLs to reference books on the server or stored on other servers. The URLs may contain various complex parameters which control the properties of the voice the user hears. In this example, a plug-in module according to the present invention may be used to automatically generate URLs for the books of interest, where the generated URLs comprise configuration parameters so that the voice sounds the way the user desires when the book is "read" aloud. These URLs may then be provided to a proprietary reader which is enabled to connect to the referenced book on the referenced media server and read the book aloud using the voice parameters comprised in the URL. The present invention may be used in numerous other examples or applications.

Figure 2A:
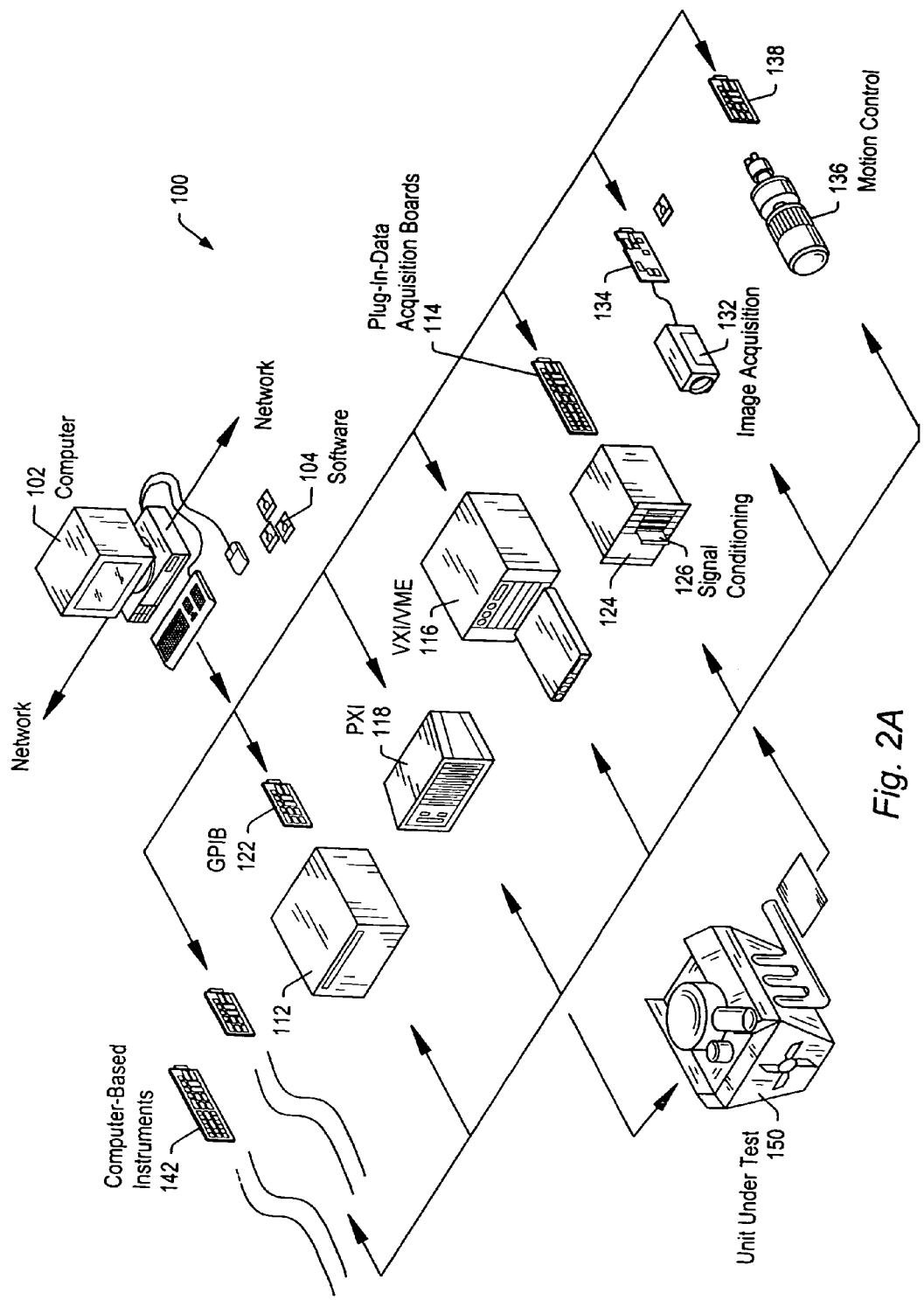
FIGS. 2A and 2B illustrate representative instrumentation and process control systems including various I/O interface options.
Figure 2B:
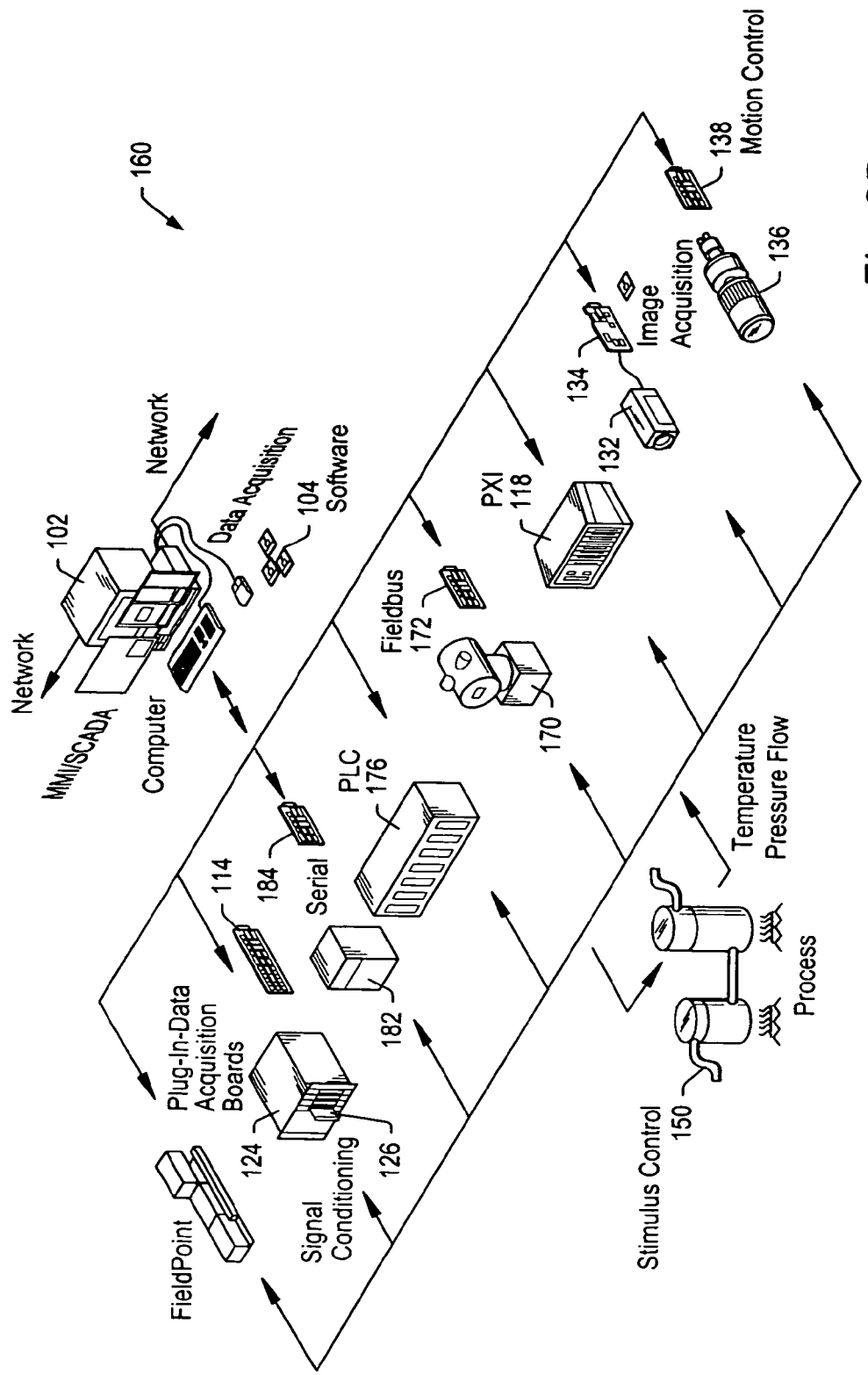

FIGS. 2A and 2B—Instrumentation and Industrial Automation Systems

FIGS. 2A and 2B illustrate example systems where the present invention may be used. The present invention may of course be used in other types of systems as desired.

FIG. 2A illustrates an instrumentation control system 100. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure or control a unit under test or process 150. The host computer 102 may store computer programs according to the present invention for generating URLs to reference data stored in or generated by any of the instruments. These programs may also be stored on another computer connected to the host computer 102 and may be used for generating URLs to reference this data.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MM (Man Machine Interface), SCADA (Supervisory Control and Data Acquisition), portable or distributed data acquisition, process control, advanced analysis, or other control. In FIG. 2B, the computer 102 may also store computer programs according to the present invention for generating URLs to reference data stored in or generated by any of the devices. These programs may also be stored on another computer connected to the host computer 102 and may be used for generating URLs to reference this data.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 2A and 2B, the computer system 102 preferably includes a memory media on which computer programs according to the present invention are stored. The term "memory media" is intended to include an installation media, e.g., a CD-ROM, or floppy disks 104, a computer system memory such as DRAM, SRAM, EDO RAM, etc., or a non-volatile memory such as a magnetic media, e.g., a hard drive, or optical storage. The memory media may also store one or more URLs generated by the present invention. The memory media may also store a Data Socket client according to the invention, such as disclosed in U.S. patent application Ser. No. 09/185,161. The memory media may also store application programs operable to use the Data Socket client and the URLs generated by the present invention for accessing data. It is noted however that the Data Socket client, the application programs, the computer programs of the present invention, the URLs generated by the present invention, or any combination of these, may be stored in the memory media of another computer. For example, another computer may use the computer programs of the present invention to generate URLs usable for accessing the addressable data sources/targets of the devices connected to the computer 102.

As noted above, the memory media may store computer programs according to the present invention. These programs may comprise a URL generation manager that manages the process of identifying the data sources/targets connected to the computer system and generating the URLs for each of them. The programs may also comprise plug-in modules for each type of data source/target. The plug-in modules interface with the URL generation manager. The host CPU executing code and data from the system memory comprises a means for generating URLs for configuring and accessing data sources/targets according to the steps described below.

In the preferred embodiment, application programs which use the URLs generated by the present invention are designed for data acquisition/generation, analysis, and/or display, and for controlling or modeling instrumentation or industrial automation hardware. However, it is noted that the present invention can be used for a plethora of applications and is not limited to instrumentation or industrial automation applications. In other words, FIGS. 2A and 2B are exemplary only, and the present invention may be used in any of various types of systems. Thus, the system and method of the present invention may be applied to any of various types of applications, including general purpose software applications such as word processing, spreadsheets, network control, games, etc.

Figure 3:
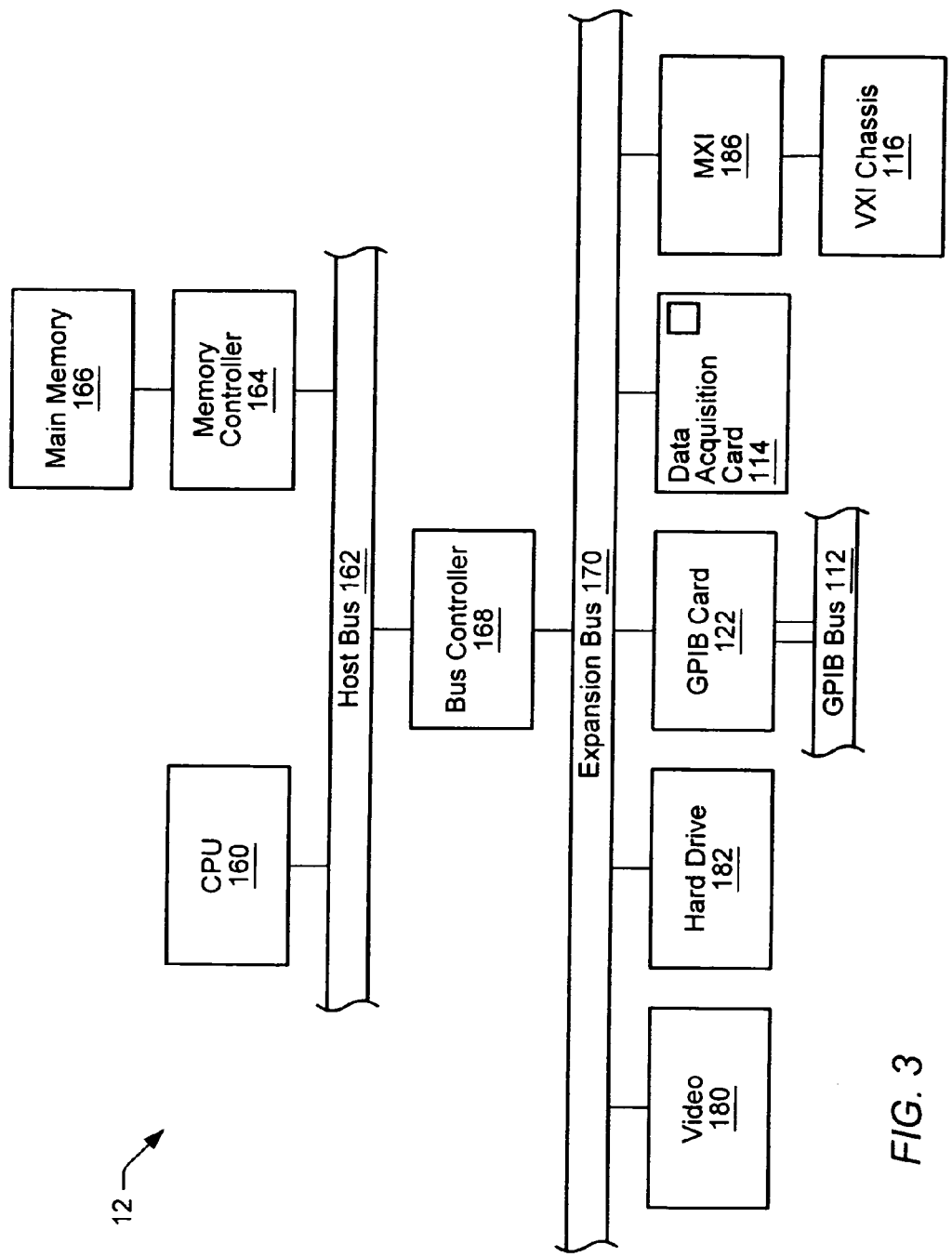
FIG. 3 is a block diagram of the computer system of FIGS. 1, 2A and 2B.

FIG. 3—Computer System Block Diagram

FIG. 3 is a block diagram of the computer system illustrated in FIGS. 1, 2A and 2B. It is noted that any type of computer system configuration or architecture can be used as desired, and FIG. 3 illustrates a representative PC embodiment. It is also noted that the computer system may be a general purpose computer system as shown in FIGS. 2A and 2B, a computer implemented on a VXI card installed in a VXI chassis, a computer implemented on a PXI card installed in a PXI chassis, or other types of embodiments. The elements of a computer not necessary to understand the operation of the present invention have been omitted for simplicity The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 stores computer programs according to the present invention. The main memory 166 also stores operating system software as well as the software for operation of the computer system, as well known to those skilled in the art. The computer programs of the present invention will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2A), a GPIB interface card 122 which provides a GPIB bus interface to the GPIB instrument 112 (of FIG. 2A), and a VXI or MXI bus card 186 coupled to the VXI chassis 116 for receiving VXI instruments. The computer 102 further comprises a video display subsystem 180 and hard drive 182 coupled to the expansion bus 170.

Figure 4:
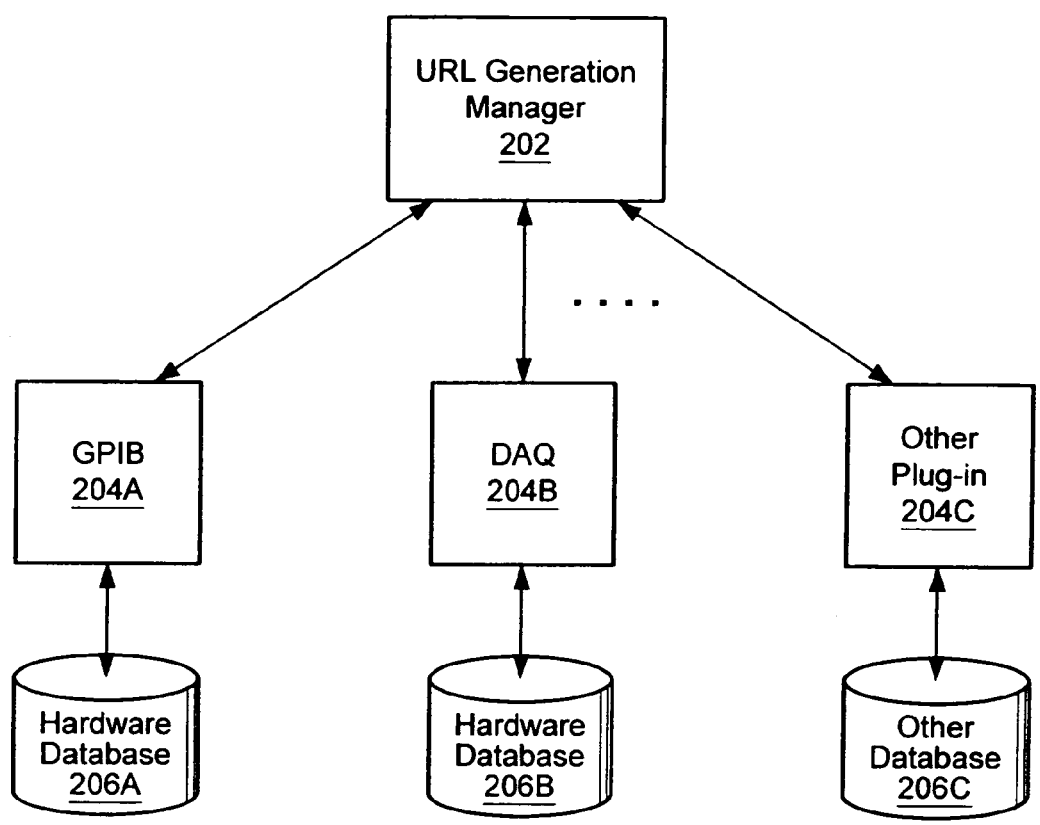
FIG. 4 is a block diagram illustrating the relationship of portions of the computer programs of the present invention.

FIG. 4—Block Diagram

FIG. 4 is a block diagram illustrating the relationship of portions of the computer programs of the present invention. As discussed above, the present invention includes a URL generation manager 202 and plug-in modules 204. The URL generation manager 202 manages the overall process of identifying data sources/targets connected to the computer system and generating the URLs for each of them. The URL generation manager 202 interfaces with plug-in modules 204A, 204B and 204C, which actually do the work of identifying data sources/targets and generating appropriate URLs. The plug-in modules may be specific to a particular data source/target type or class. For example, FIG. 4 shows GPIB plug-in module 204A which is separate from DAQ plug-in module 204B. Any number of plug-in modules may be present so that all data source/target types or classes may be represented. It is noted that plug-in modules may be present which generate URLs for data sources/targets that are not associated with a hardware device. For example, plug-in module 204C could be a plug-in module to generate URLs usable for accessing http servers. As another example, a plug-in module to generate URLs for accessing files or a particular type of file may be present.

Each plug-in module may interface with a database 206. Certain plug-in modules may interface through a configuration manager to one or more databases. FIG. 4 illustrates a GPIB hardware database 206A, a DAQ hardware database 206B, and another type of database 206C. As referred to herein, a hardware database is a database containing information regarding the capabilities, and/or addressable data sources and targets, and/or other characteristics of a hardware device. For more information on a DAQ hardware database used in the preferred embodiment and a configuration manager for the DAQ hardware database, please see U.S. patent application Ser. No. 08/943,784 titled, "Configuration Manager for Configuring a Data Acquisition System" filed Oct. 3, 1997, which is hereby incorporated by reference.

The database 206C may be a hardware database, or it may contain another type of information. For example, the database 206C may contain information about the locations and characteristics of various .WAV files. In this example, the plug-in module 204C may use the information contained in the database 206C to generate URLs to access data contained in the .WAV files, where the generated URLs may contain parameters for properly accessing the data contained in particular .WAV files. For example, a Data Socket may use these URL parameters to decide how the data contained in a particular .WAV file should be converted to a form easily used by an application.

The plug-in modules 204 that are specific to hardware device data sources/targets preferably use information from system configuration software, such as Plug & Play software, to aid in identifying devices connected to the computer. These plug-in modules 204 query the hardware databases 206 to identify each device and determine its capabilities and addressable data sources/targets. The plug-in module 204 generates a separate URL to identify or access each addressable data source/target. For example, for a system containing two DAQ boards with eight channels each, DAQ plug-in module 204B may generate sixteen separate URLs, one for each channel. The URLs may contain configuration information. The plug-in modules may generate more than one URL for each data source/target, where each URL contains different configuration information.

The URL generation manager may integrate the URLs generated by the plug-in modules with the computer operating system so that a user may easily access them. For example, in one embodiment, the URLs are integrated into the user interface of the Windows Explorer tree through Windows shell extensions (see FIG. 7).

Figures 5, 6:
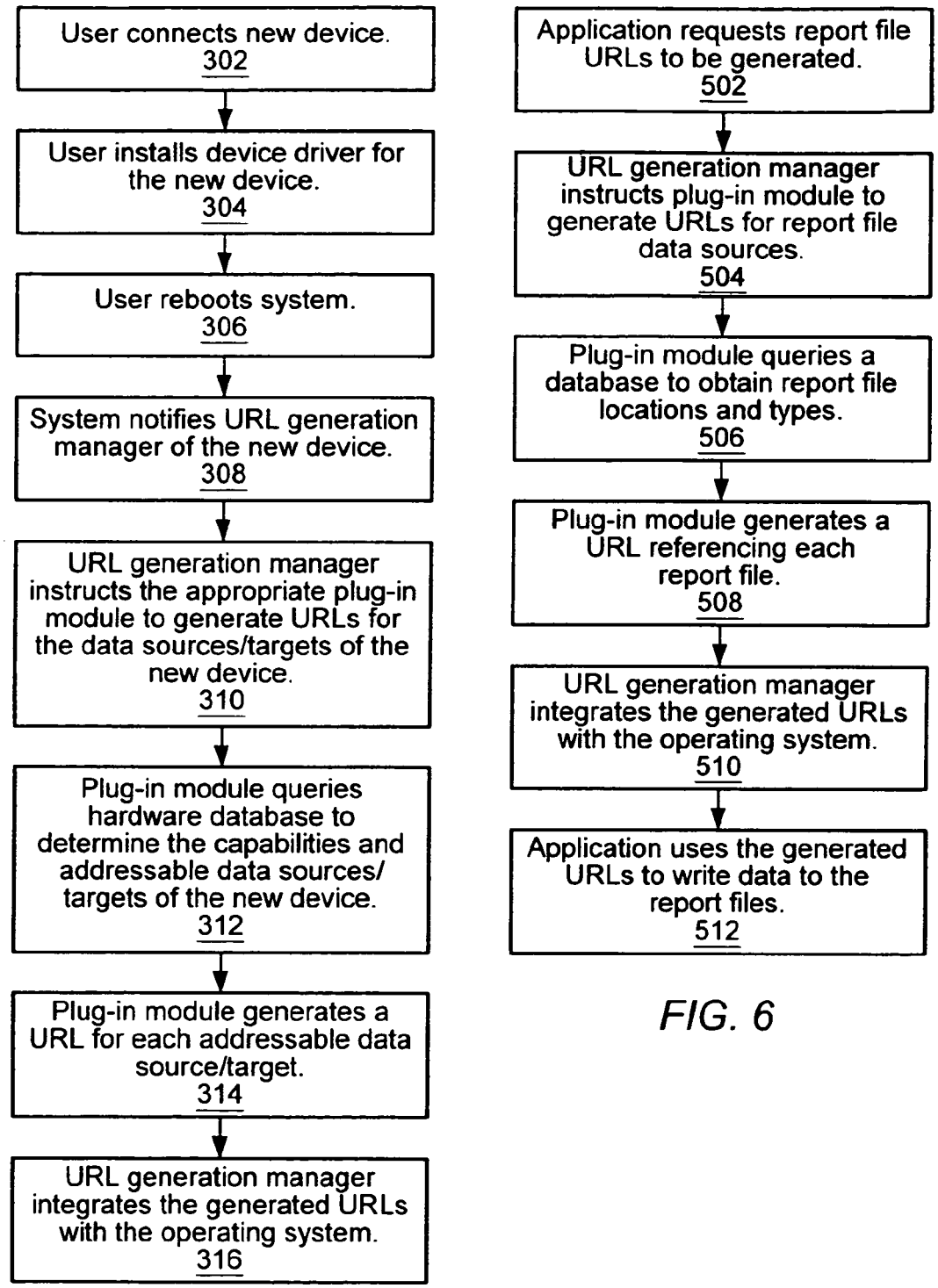
FIG. 5 is a flowchart diagram illustrating automatic generation of data source/target URLs when a new device is connected to the computer.
FIG. 6 is a flowchart diagram illustrating automatic generation of URLs referencing files as data targets.

FIG. 5—Flowchart Diagram

FIG. 5 is a flowchart diagram illustrating one use of the present invention, where a new device is installed in the computer system and URLs referencing the addressable data sources/targets of the new device are automatically generated. It is noted that various steps in FIG. 5 may occur concurrently and/or in different orders.

As shown, in step 302 the user connects a new device to the computer system. As discussed above, the device may be of any type and may be a Plug & Play or a manually configured device. In step 304 the user may install a device driver for the new device. In step 306 the user reboots the system. These three steps may be performed in combination with each other or may not be necessary. For example, a device driver may be automatically installed by the system in step 302 when the new device is connected. In some systems or for some devices, the user may not be required to perform step 306 of rebooting the system.

In step 308 the system detects that a new device has been installed and notifies the URL generation manager of this event. The system may also determine the exact type of device that has been installed. In the preferred embodiment, this notification is accomplished by integrating the URL generation manager with the Plug & Play system of the operating system. Typically, the Plug & Play software is able to determine the exact device that has been installed, such as detecting the National Instruments PCI-6110E data acquisition (DAQ) board.

In step 310 the URL generation manager may use the device information received from the system to determine the device type such as DAQ, GPIB, etc. The URL generation manager may query a hardware database to determine this. Based on the device type, the URL generation manager instructs the appropriate plug-in module to generate URLs for the addressable data sources/targets of the new device.

In step 312 the appropriate plug-in module queries a hardware database to determine the capabilities and addressable data sources/targets of the new device. The plug-in module uses the device information received by the Plug & Play software, such as the identification of the specific device installed. For example, if the new device is a particular DAQ device, the DAQ plug-in module may query a hardware database to determine the capabilities and configuration information of the particular DAQ device, e.g., it may learn that the DAQ device has eight channels. It may also obtain information regarding the capabilities or characteristics of these channels, e.g. their valid voltage ranges.

In step 314 the plug-in module uses the information regarding the addressable data source/target identities and their capabilities and configuration information that was determined in step 312 to generate a URL for each addressable data source/target. Each URL is useable for accessing data from/to a respective data source/target, i.e., each URL is useable for reading data from the respective data source or writing data to the respective data target.

As stated above, each plug-in module may be specific to a particular type or class of data source/target. The plug-in module comprises or accesses information specifying the required URL form and syntax for particular data source/target types. This information may be inherently stored in the plug-in module executable code logic, or it may be stored in other ways. For example, the plug-in module may access a template which specifies the general form of a particular URL type, and the plug-in module may fill in particular fields of the template with parameters appropriate for a particular data source/target. The plug-in module may interface with one or more databases to determine the appropriate template to use and to determine the appropriate parameters to use for a particular device.

The required form and syntax for URLs of a particular class or type may be ultimately determined by the applications that will use the URLs. Thus, plug-in modules may be specific not only to the type or class of data source/target, but also to the system that will use the URLs. For example, a system may contain one DAQ plug-in module which automatically generates URLs for DAQ device data sources/targets, where the URLs are to be used by Data Socket-enabled applications. The system may contain another DAQ plug-in module which automatically generates DAQ URLs, where the URLs are to be used by applications utilizing some other DAQ-specific communication protocol.

The URLs may contain device configuration information based on the information obtained from the hardware database. For the above example, a DAQ plug-in module may generate a URL for each of the eight channels, where the URLs may contain configuration parameters regarding the valid voltage ranges for the channels. The plug-in module may generate more than one URL for each data source/target. Each URL may differ in the configuration information it contains.

Continuing the example, a simple default DAQ-specific URL template may be:
daq://<serverName>/<deviceIdentity>?channel=<channel>&maxV=<maxV>
where <servemname>and <deviceIdentity>are fields to be filled in with address/identity information determined in step 312, and <channel>is a field to be filled in with a different channel number for each URL, and <maxV>is a field to be filled in with the maximum voltage value for the DAQ device, as determined from step 312.

A plug-in module may use different templates for different types of data sources/targets, as appropriate. For example, if a special attribute applies to DAQ devices of a particular class but not to DAQ devices in general, the plug-in module may use a different template containing a field for the attribute to generate the URLs for the data sources/targets of devices belonging to that particular class of DAQ devices. Also, a plug-in module may have associated utilities which allow a user to specify the default URL parameters that may be generated for various fields when the parameters for a particular device may take on one of several values.

Specific examples of URLs that may be generated by plug-in modules are shown below. Each of these URLs is intended to be provided to an application enabled to: parse the URL information to determine the address of the data source/target the URL refers to; connect to the data source/target; utilize any configuration information contained in the URL to configure the data source/target or the data sent to/received from the data source/target; send data to the data target or receive data from the data source; etc. Information on how Data Socket-enabled applications perform these operations is given below (see FIGS. 10A and 10B).

daq://localDAQServer/Device1?channel=2&maxV=10

This URL identifies and configures a particular DAQ device channel.

dstp://dataserver.natinst.com/testwaves/wave1.wav

This URL references a .wav file through the Data Socket Transfer Protocol (described below).

opc://National Instrument.DAQOPC/Dev1_A1_Chan_0

This URL references a DAQ device channel through the Ole for Process Control (OPC) standard interface.

http://localhost/wave1.wav

This URL references a .wav file data source from an http server.

Figure 7:
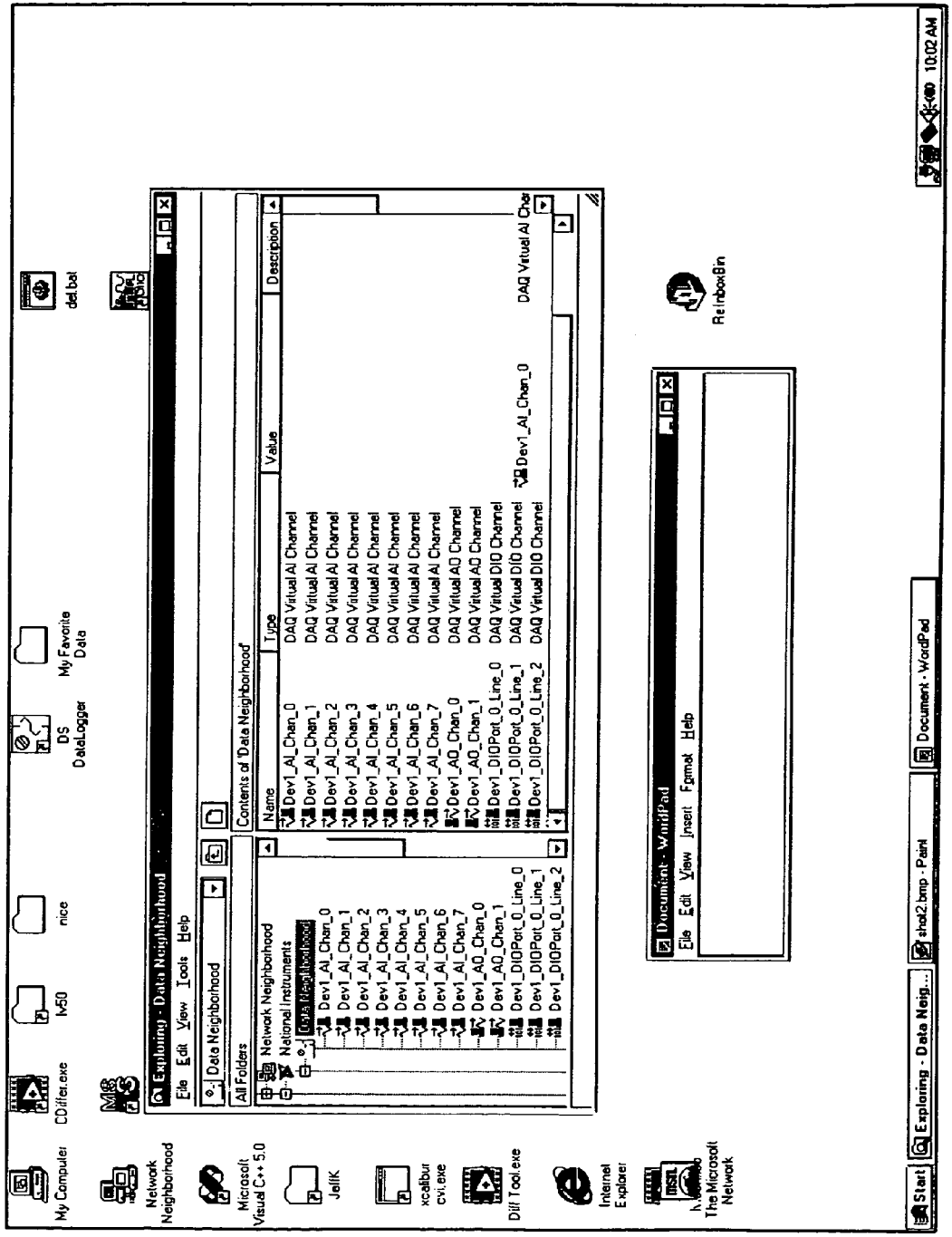
FIG. 7 is a screen shot illustrating integration of the generated URLs with the operating system in a standard user interface.

In step 316 the URL generation manager may integrate the URLs generated by the plug-in module with the operating system so that they may be easily accessed for use in application programs. For example, the URLs may be integrated as icons into the explorer tree of the Windows operating system. FIG. 7 describes this integration in more detail.

Figure 8:
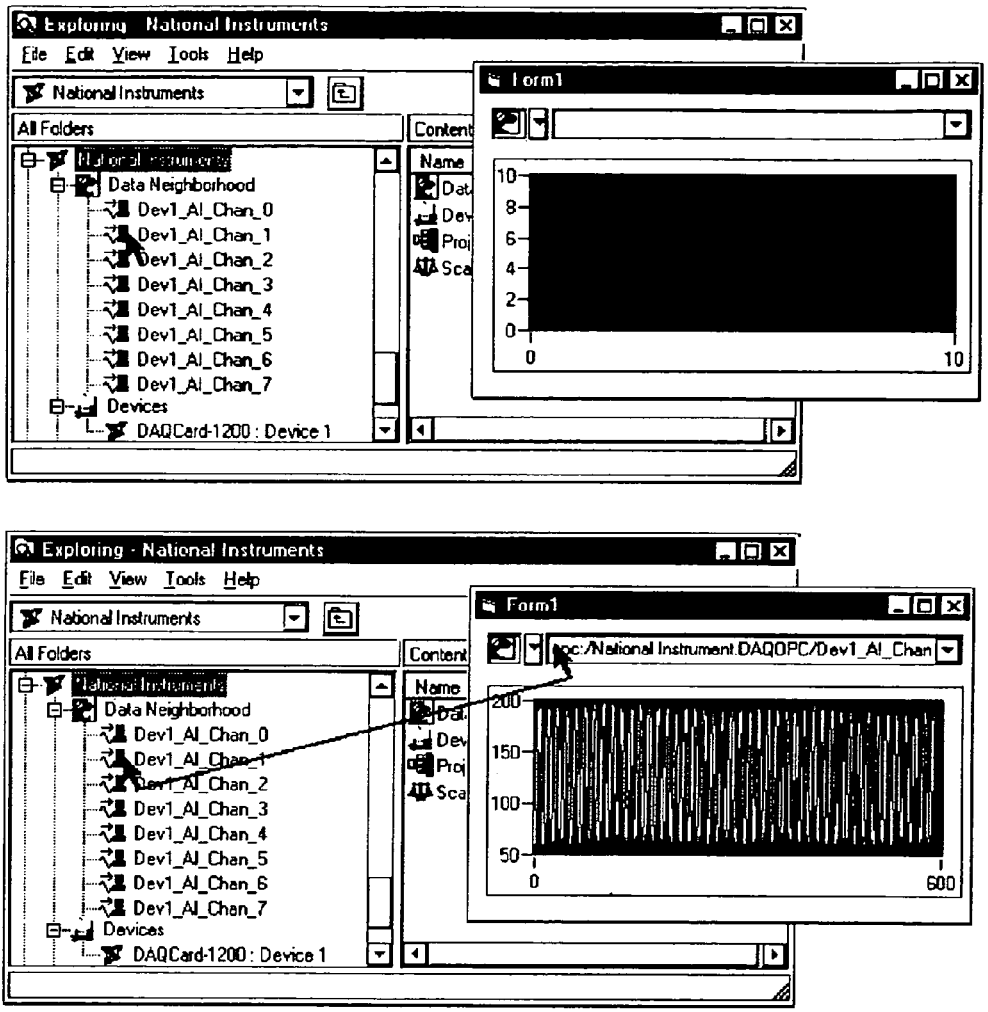
FIG. 8 is a screen shot illustrating how a URL icon may be dragged and dropped into an application program.

At the end of this process the user may provide the new URLs to an application program enabled to use them in order to access the data sources/targets of the new device. FIG. 8 illustrates one embodiment in which a URL icon is dragged and dropped into an application program. Thus a user may connect a device to the system and begin reading data from or writing data to the device almost immediately without needing to know about the device hardware or software. In one embodiment, the URL generation manager automatically provides the new URLs to certain applications, such as applications that have previously registered with the URL generation manager.

The above description is for a case where a new device is connected to the computer and URLs are generated for all the data sources/targets associated with the device. However, a similar process may be performed to generate URLs referencing all of or a subset of the data sources/targets for all of or a subset of the devices. The URL generation process may, for example, be initiated at system boot, or in response to a user request, or in response to some other event or condition. For each of these cases the URL generation manager may instruct the plug-in modules to generate URLs for the different data sources/targets, as appropriate to the situation. For example, the above description may be modified so that URLs are generated for all data sources/targets of all devices at system boot time.

The URL generation process may be applied to other data sources/targets besides hardware device data sources/targets. An example of one such use is described below in FIG. 6.

FIG. 6—Flowchart Diagram

FIG. 6 is a flowchart diagram illustrating a simple example where URLs referencing files as data targets are automatically generated. For the purposes of this example, we assume that the user is running an application program that creates data and uses it to write reports to files having various formats in disparate locations.

In step 502 the application requests the URL generation manager to generate URLs referencing the report files. In step 504 the URL generation manager instructs an appropriate plug-in module to generate the URLs.

In step 506 the plug-in module queries a database to obtain information about the report files, such as their locations and format types. For example, the application may need to write its data to various files that several other applications use, where each file requires a different format. The database may contain information regarding where these files should be created and how they should be formatted.

In step 508 the plug-in module uses the information obtained from the database to generate a URL for each report file. These URLs may contain formatting parameters indicating how data should be written to the file.

In step 510 the URL generation manager may integrate the generated URLs with the operating system. In step 512 the application program uses the generated URLs to access the report files and write data to them in the appropriate format. Step 510 may be omitted; e.g., the URLs may be passed directly back from the URL generation manager to the application program. In the preferred embodiment, the application program contains a Data Socket which uses an appropriate URL AccessMethod Extension to write data to the report files.

FIG. 7—Screen Shot

FIG. 7 is a screen shot illustrating one embodiment of the integration of the generated URLs with the computer operating system. The screen shot shows the explorer "tree from the Windows Explorer program of a computer running the Windows operating system.

Under the Data Neighborhood heading of the explorer tree, several items are shown comprising an icon along with a name. Each of these items represents a URL generated by the present invention. Each URL identifies and possibly configures an addressable data source or target identified in the process described above. For example, eight items are present with the names Dev1_A1_Chan_0 through Dev1_A1_Chan_7. In this case, the DAQ plug-in module identified a DAQ device with eight input channels during the process described above and generated a separate URL for each of them. The URL generation manager used Windows shell extensions to create an item in the explorer tree for each URL. Since the use of Windows shell extensions is well known in the art, details of this operation are omitted for simplicity. Also shown in the screen shot are items for other addressable data sources of the same device.

This integration of the URL with the user interface of the operating system allows easy access to the data source/target identified by the URL. In the preferred embodiment, a user could simply drag and drop a URL icon into a Data Socket target of an application program and data binding to the data source/target identified by the URL would occur automatically (see FIG. 8).

The integration of the URL with the user interface of the operating system also allows the user to easily edit the URL. For example, in one embodiment, utilities are coupled with the Windows operating system through Windows shell extensions so that a user can simply right click on a URL item to bring up a dialog window to edit the URL. The dialog may display attributes specific to the data source/target type. Thus, a user can change the configuration information for the URL without needing to know the required syntax. For example, if the user right clicks on the icon labeled Dev1_A1_Chan_0 in the screen shot, a dialog may appear allowing the user to edit attributes of channel 0 for DAQ device 1

FIG. 7 illustrates one embodiment of a user interface to access the URLs. The user interface may of course take other embodiments as desired or as appropriate to a particular computer system. For example, in one embodiment the system includes a data source/target browser that provides a standard user interface for allowing users to select a data source/target. For example, the Measurement Explorer product available from National Instruments, is one such browser utility. Measurement Explorer acts as a catalog of devices, virtual channels, and other data sources/targets which make up a Data Neighborhood. Each item in the Data Neighborhood has an associated URL. Users may browse the Measurement Explorer user interface to select a data source/target to provide to an application.

The user interface to the data source/target URLs may provide features other than the ones described above. For example, the user may be able to perform certain operations on the data source/target directly from this user interface without the need to provide the URL to an application program. These operations may include displaying the current connection status to the data source/target, triggering the data source, e.g., a refresh operation, etc.

FIG. 8—Screen Shot

FIG. 8 illustrates one way of how a user may easily provide a URL generated by the present invention to an application program to access a data source. The upper screen shot shows the Windows Explorer tree after URLs referencing data sources of a DAQ device have been generated and integrated with the operating system. In the lower screen shot of this example, the arrows indicate that a user may drag a URL icon referencing a DAQ device channel over an application program and drop it in, and data binding to the channel will automatically occur.

In the preferred embodiment, the application program contains a Data Socket operable to detect that the URL icon has been dropped into the application and determine the URL that the icon represents. The Data Socket uses the URL to connect to the data source, read data from it, convert the data into an appropriate format, and return the data to the application program. In the example shown, the application displays this real-time data as a waveform.

Figure 9:
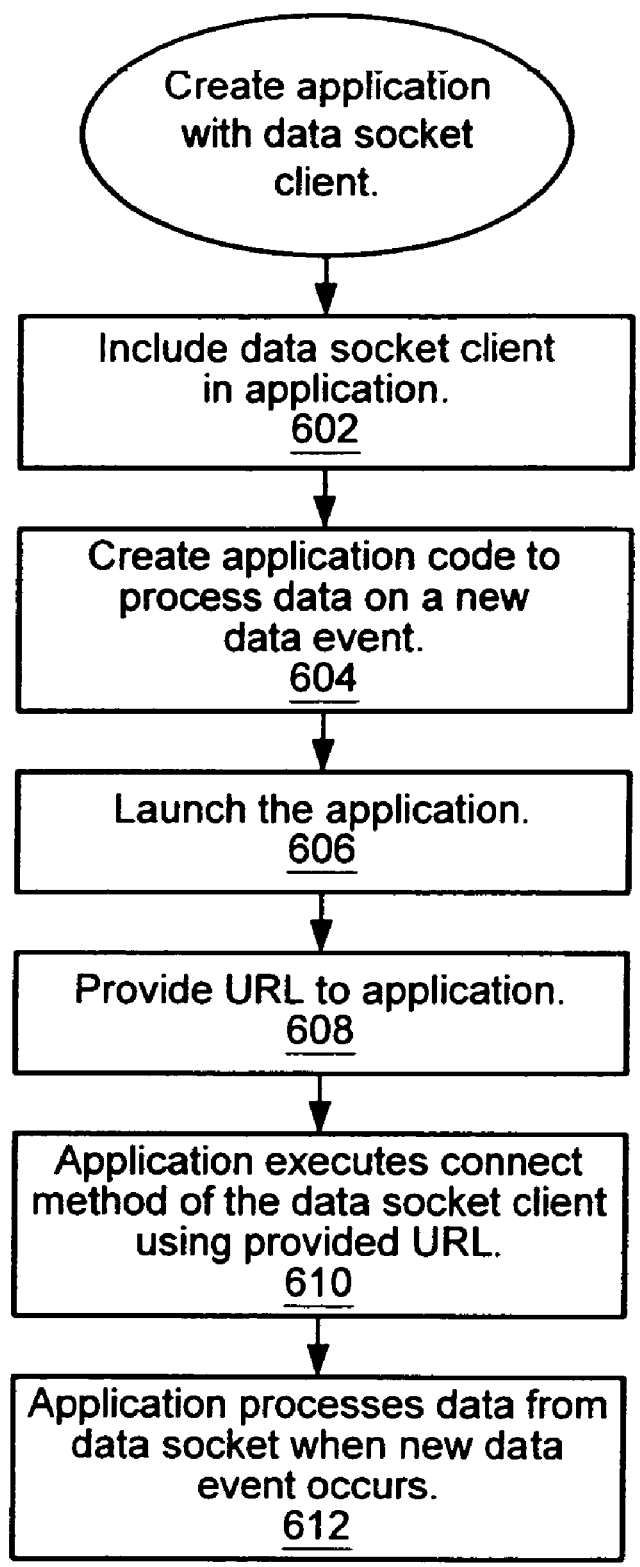
FIG. 9 is a flowchart diagram illustrating the use of a generated URL in a Data Socket-enabled application program.

The next section provides more background information on the Data Socket system and method. FIGS. 9 and 10, which follow, illustrate the use and operation of Data Sockets.

Data Socket Client and FlexData—Sharing Information across Systems and Applications The URLs generated by the present invention are used to address disparate data sources/targets in a uniform manner. In the preferred embodiment, they are used together with the Data Socket system and method disclosed in U.S. patent application Ser. No. 09/185,161 and referred to throughout the present application. This section provides background information on the Data Socket data access system and method. For more information, see the above-referenced application.

Data Socket Overview

The Data Socket client, also referred to as "Data Socket", comprises a set of tools which simplify the exchange of data and information between an application and a number of different data sources and targets. These sources and targets are other entities in the system that data is read from or written to and include other applications, files, HTTP servers, OLE/ActiveX automation servers, I/O devices and more. In many cases these sources and targets may be located on a different machine from the one performing the read and write operations. The term "Data Socket" is an umbrella name for tools in different formats, such as ActiveX controls, java applets, LabVIEW VIs, and CVI instrument drivers, using a common technology for data exchange.

The preferred data format used by Data Socket tools, called Flex Data or FlexData, is enhanced for instrumentation style data and may include attributes in addition to the actual data. Data attributes may include information such as an acquisition rate, test operator name, time stamp, quality of data, etc. The Flex Data data format may be readily adapted for other applications and may include other application-specific attributes, as desired.

Data Socket tools allow users to easily transfer instrumentation style data between different applications, applications and files, as well as different machines. Currently these types of transfer are done using less specialized tools such as general-purpose file I/O functions, TCP/IP functions, HTTP/HTML transfers combined with CGI programs, and more. With all of these existing technologies, the user is required to perform a significant amount of programming to accomplish his/her tasks. The Data Socket client and tools provide improved functionality and reduce development effort and time.

Data Socket sources and targets are addressed using URLs (Uniform Resource Locators) that follow the standard URL model. Data Socket supports standard transfer formats including http:, ftp:, and file: and defines additional transfer formats. Data Socket also includes an extension mechanism that allows users to add support for future formats without modifying existing programs that use the Data Socket.

Underlying Technologies

OLE/ActiveX

ActiveX and COM (component object model) are preferably used in much of the underlying architecture of the Data Socket tools including the Data Socket server (DataServer) and data object (CWData ActiveX object).

TCP/IP

TCP/IP (transfer control protocol/Internet protocol) is used to transfer data between the DataServer and different Data Socket clients.

HTTP

HTTP (hyper text transfer protocol) is used to make requests from Data Socket clients to web servers and return the information.

FTP

FTP (file transfer protocol) is used to make requests from Data Socket clients to FTP servers and return information stored in a file.

URL

URLs (Uniform Resource Locators) are used to address or identify a Data Socket client's source or target. A URL string starts with its access method, such as http:, which the client uses to determine how to connect to the source or target.

Data Socket Client

The Data Socket client, also referred to as the Data Socket control, is the name used to refer to the component that an application uses to connect to a Data Socket source or target. Data Socket clients have different formats for different development environments. (ActiveX control, LabVIEW VI, CVI instrument driver/DLL, etc.)

Flex Data

Flex Data, also referred to as FlexData, is the format of the underlying data packet that Data Socket tools may use to send and store information. These packets are system independent and can be transferred over existing communication technologies such as ActiveX Automation/COM or TCP/IP. The FlexData data packet has provisions for adding standard and user defined named attributes that are used to further describe the information contained in the packet. For instrumentation-specific functions, information such as a time stamp, test operator name, Unit-Under-Test (UUT) identifier, and more can be added to the data being transferred. Data Socket clients convert data native to an environment and its attributes into Flex Data format or convert Flex Data formatted data back into its native data form. The Flex Data packet is self-describing so no additional information must be exchanged between a client and its source or target.

Data Object

The Data Socket data object (CWData ActiveX object) is used in conjunction with the Data Socket ActiveX control to store data along with all additional attributes.

Data Socket Server

The Data Socket server is a stand-alone process running on a system to facilitate transfer of data between different processes when no other servers are in place. In many cases Data Socket clients exchange information with some other type of server such as a web server, automation server or file server. In cases where a customer desires to directly transfer information between Data Socket clients, the Data Socket server preferably acts as the intermediate data repository. The Data Socket server is dynamically configurable such that any Data Socket can create tags (storage locations) in the Data Socket server. Any Data Socket client can then retrieve the stored information based on the name of the tag.

Implementations

ActiveX control

The Data Socket client functionality is preferably implemented with an ActiveX control and underlying objects. The ActiveX control is preferably optimized for Microsoft Visual Basic/VBA(Visual Basic for Applications)/VB Script but is also compatible with other ActiveX control containers including Microsoft Visual C/C++, Borland Delphi, Borland C++ Builder and National Instruments HiQ 4.0. The Data Socket ActiveX control is part of the ComponentWorks tools suite available from National Instruments Corporation and is called CWData Socket. One other significant ActiveX component is the CWData object which stores data transferred by the CWData Socket control.

LabVIEW VIs

LabVIEW/BridgeVIEW VIs implement the same Data Socket client functionality as the ActiveX control in a form native to the G programming syntax.

Instrument Driver

An instrument driver developed in LabWindows/CVI implements the same basic Data Socket client functionality as the ActiveX control. The instrument driver includes function panels for use in the LabWindows/CVI environment and allows creation of a DLL containing a type library. Natively in CVI the instrument driver should also support CVI callback functions to implement Data Socket client events.

Java Bean

One embodiment comprises a Java bean developed in Java that implements the same basic Data Socket client functionality as the ActiveX control. The bean is written in "Pure Java" and can be run on several different computer platforms.

Additional Components

URL AccessMethod Extensions

The Data Socket client includes built-in support for standard sources/targets such as files, FTP and HTTP. Other built-in support includes exchange with a Data Socket DataServer using TCP/IP, referred to as DSTP. Developers are also able to define their own extensions or plug-ins that allow the Data Socket to connect to their own data sources/targets. Extensions are identified by the URL access method. The URL Access is the part of the URL string that precedes the first colon ":". A Data Socket extension is preferably implemented using an automation server written to a common specification. The automation server and unique extension name are registered with the operating system. The Data Socket client uses the automation server when it detects the corresponding access method, which is not supported natively but is registered with the OS. Applications of Data Socket extensions include direct links to OPC servers, external instruments, Data Acquisition (DAQ) devices, databases, multimedia devices, and others.

File Adapter Extensions

The Data Socket clients support certain common file formats such as tab delimited text when performing file I/O operations. As noted above, the user can also create their own file adapters that the Data Socket client will use to read or write files using custom-defined formats. The file name extension or other explicitly stated identifier determines the file format used for a particular operation. File adapters preferably comprise automation servers that are written to a common specification and registered with the operating system.

User Control

Data Socket provides user level tools and utilities to interact and work more easily with Data Socket. A Data Socket user control may provide a simple pre-defined user interface for entering a URL, connecting to the source or target, and monitoring the connection status. In the preferred embodiment, the user control is drag-and-drop enabled so that a user may simply drag a URL icon and drop it into the control. The data binding to the data source or target identified by the URL then occurs automatically.

Applications

Interactive Web Pages

One primary use of the Data Socket is the ability to develop interactive web or remote interfaces for applications running on a particular machine. Currently there are tools available, including the LabVIEW and CVI Internet Toolkits, to provide some amount of interaction between a web browser and an application running on a server. However this interaction is very limited in most cases or requires significant amounts of programming using CGI and HTML image maps. The Data Socket tools enable a user to very simply build a remote application that can interact with the main application to send updated information or commands back and forth. The Data Socket client, e.g., a Data Socket ActiveX control, also enables a user to simply build such a remote application in a web page and provide a web browser-based interactive interface to a server application. Applications such as running remote experiments or providing web based supervisory control to an automation process become feasible and relatively simple to implement.

Universal Input API for Programming

The Data Socket may thus be used as the primary means to retrieve data into a user's application, thus greatly simplifying the task compared with using traditional I/O mechanisms like file IO. For example, by using the Data Socket to read in waveforms to display in a graph, the user's application is relieved from all tasks related to parsing raw data since the Data Socket returns the Waveform as an easy to use array of numbers. Thus an application can read data from files of many different formats, or from many different sources, such as ftp, http(web), or file servers. An end user can even allow the application to read waveforms from new file formats or new hardware devices by creating a new Data Socket extension.

Broadcast Distribution of Live Data

A data acquisition application can use a Data Socket client or control to write live data to a Data Socket Server that in turns distributes data to other Data Sockets that have connected to the server to read data from the server. This method is advantageous over typical current scenarios since the data passed can include attributes that do not interfere with the primary value being sent. This allows the source Data Socket to add new attributes with out breaking the Data Socket clients that are reading the Data.

The Data Socket can also be used in multimedia applications for live or distributed video, including streaming video applications and multicast video. In this application, the multimedia or video application uses a Data Socket client or control to write live data to a Data Socket Server that in turns distributes data to other Data Sockets that have connected to the server.

FIG. 9—Flowchart Diagram

FIG. 9 is a flowchart diagram illustrating the preferred embodiment in which a URL of the present invention is used in conjunction with the Data Socket client disclosed in U.S. patent application Ser. No. 09/185,161 to read data from a data source. It is noted that various steps in FIG. 9 may occur concurrently and/or in different orders.

As shown, in step 602 the user includes or incorporates the Data Socket client into an application.

Where the Data Socket client is a control, the user drops the Data Socket control, which is preferably a standard interface complaint control, onto a window of a container in step 602. An example of the window is a Visual Basic form. The standard control interface is preferably the interface defined by the Microsoft ActiveX Control Specification. Controls which conform to the ActiveX OLE Control Specification are referred to as ActiveX controls. The control dropped in step 602 is preferably embodied within the National Instruments "ComponentWorks" product, which comprises ActiveX controls. The ComponentWorks controls are described herein being used by the Microsoft Visual Basic development environment container. However, the ComponentWorks controls described may be employed in, but not limited to, the following list of containers: Microsoft Visual, FoxPro, Microsoft Access, Borland Delphi, Microsoft Visual C++, Borland C++, Microsoft Internet Explorer, Netscape Navigator, Microsoft Internet Developer Studio, National Instruments HiQ, and any other container which supports the ActiveX control specification.

The Data Socket client may also take other forms for different development environments, such as a LabVIEW Virtual Instrument (VI), a DLL (dynamic linked library), or an instrument driver/DLL, among others. In these environments, the Data Socket client is included in an application in a similar manner to other re-useable software components.

In step 604 the user creates application code in the application to process received data on a new event. Thus, when the Data Socket client triggers an event indicating that data has been received, this application code executes to process the data according to the desired application being performed.

In step 606 the user launches the application.

In step 608 the user provides the URL of the target data source to the application program. In the preferred embodiment the user simply drags the icon of a URL generated by the present invention and drops it into the application form. In this embodiment, the application is enabled to detect this drag and drop event and determine the URL represented by the icon. It is noted that the URL can also be entered via a text box or configured during creation of the application, i.e., prior to launching the application in step 606.

In step 610 the application executes a Connect method of the Data Socket client using the URL provided in step 608. The Connect method operates to access the data source identified by the URL and to retrieve the data for the application. This may also involve converting the data to a different format, such as the Flex Data format described herein. A more detailed discussion of execution of the Connect method of the Data Socket client is discussed with reference to the flowchart of FIG. 10.

When the Data Socket client generates an event signifying receipt of new data, then in step 612 the application processes the data from the Data Socket.

It is noted that steps 608–612 may be performed one or more times during the execution of the application, as desired.

It is also noted that other addressing schemes are contemplated for steps 608 and 610. Thus, depending on the evolution of the Internet and http, if other mechanisms are used for accessing data or web sites, these other mechanisms maybe used in steps 608 and 610. In addition, if the present invention is used with other or later-developed broadband networks, other types of accessing information may be used. Thus the term ° URL" is intended to include similar methodologies for accessing data, web sites, etc.

Figure 10A:
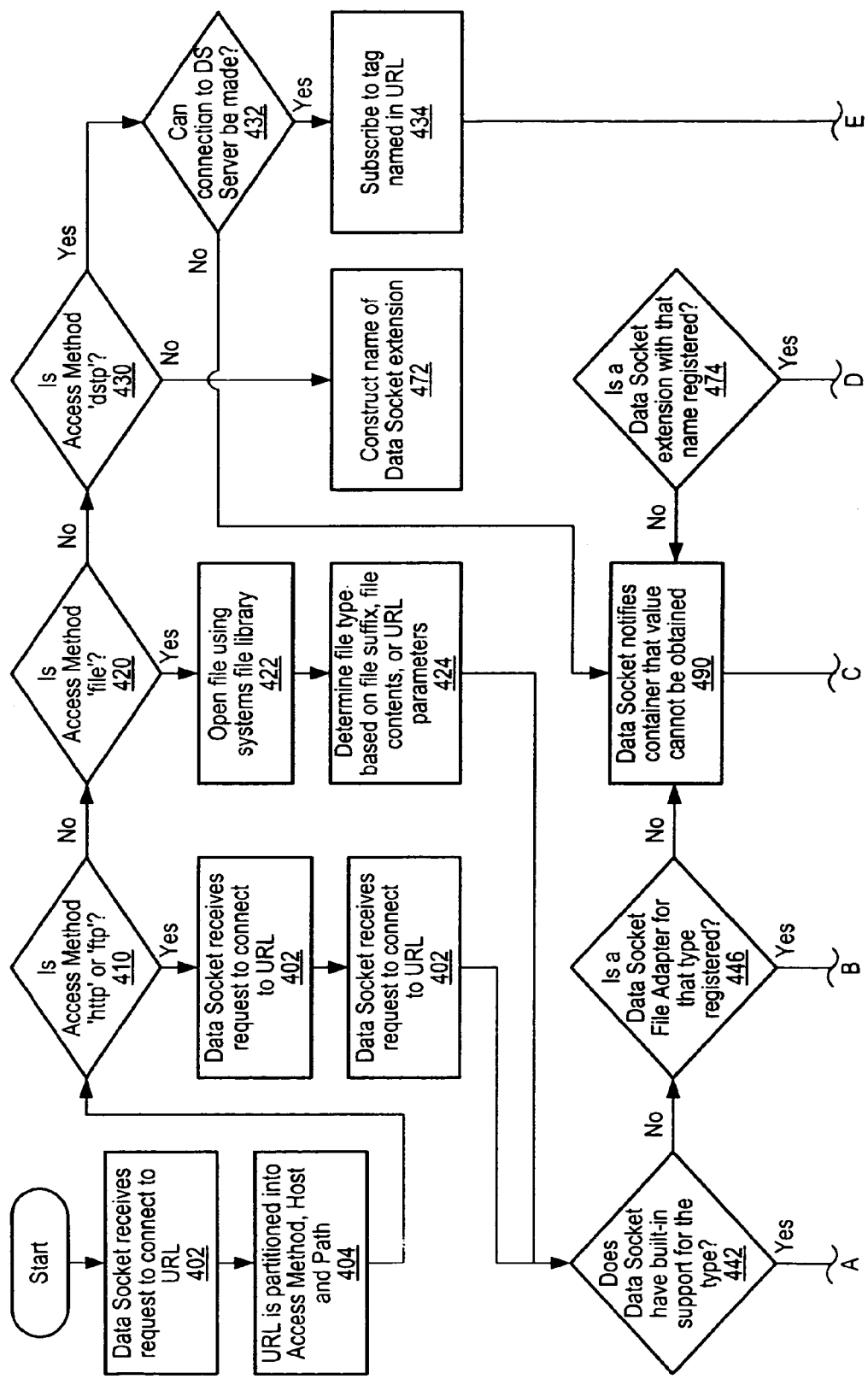
FIG. 10 is a flowchart diagram illustrating execution of a Data Socket client.
Figure 10B:
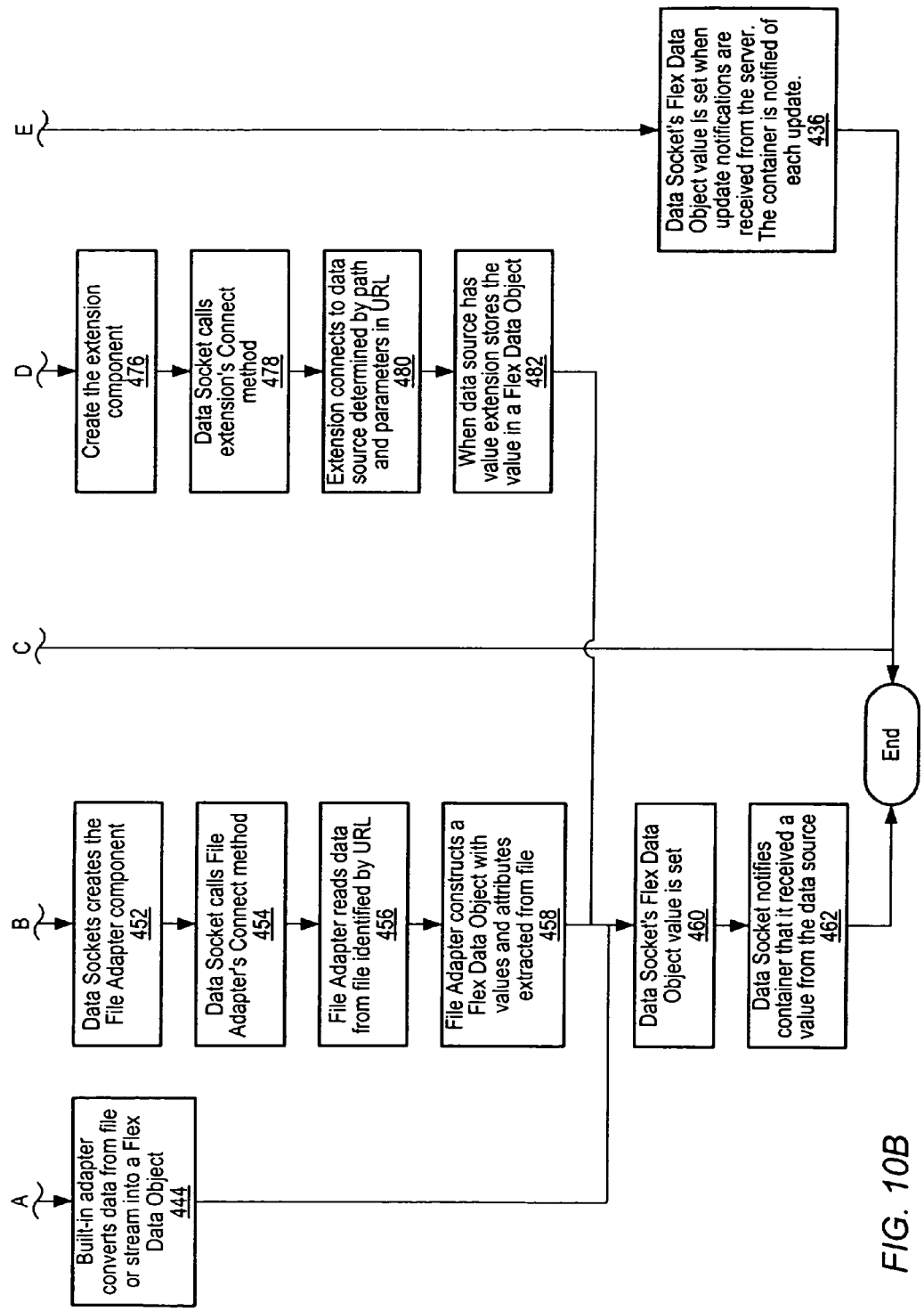

FIGS. 10A–10B: Connect Method Flowchart Diagram

FIGS. 10A–10B comprise a flowchart diagram illustrating the Connect method in the Data Socket client according to its preferred embodiment. It is noted that various steps in FIGS. 10A–10B may occur concurrently and/or in different orders. Also, FIGS. 10A–10B illustrate the preferred embodiment of the Data Socket, but the Data Socket system and method may be implemented in various ways.

As shown in step 402 the Data Socket client receives the request to connect to the specified URL. In other words, the user has provided the URL of the target Data Socket in step 608 of FIG. 9, and in step 402 the Data Socket client receives this URL input.

In step 404 the Data Socket client partitions the URL into an AccessMethod, Host and Path. The AccessMethod of the URL preferably comprises the first entry in the URL, e.g., http, ftp, file, dstp, etc. Other AccessMethods are also contemplated. The "Host" portion specifies the host computer where the data is located, and the "Path" specifies the path where the data is located on the host computer.

If the AccessMethod is either http or ftp as determined in step 410, then in step 412 the Data Socket client connects to the http or ftp server using conventional technology, e.g., using conventional Internet technology.

After step 412, in step 414 the Data Socket client determines the file type. The Data Socket client determines the file type for http based on the mime type. The Data Socket client may also determine the file type based on the URL path suffix and/or the stream contents. After step 414, operation proceeds to step 442.

If the access method is "file" as determined in step 420, then in step 422 the Data Socket client opens the file using the system's file library. In step 424 the Data Socket client determines the file type based on the file suffix, the file contents, or parameters contained within the URL. After step 424, operation advances to step 442.

After the Data Socket client has determined the file type in either of steps 414 or 424, in step 442 the Data Socket client determines if it has built-in support for the type. If the Data Socket client has built-in support for the file type as determined in step 442, then in step 444 the built-in adapter comprised in the Data Socket client converts the data from the file or stream into a Flex Data object, also referred to as a FlexDataObject.

In step 444 the Data Socket client converts the data into a form more usable by a typical programming language or application. Examples of data converted by the Data Socket include WAV files, tabbed text files, DSD files, and text. For example, if the data is retrieved from a spreadsheet, the Data Socket client converts the tab delimited spreadsheet data into a 2D array of numbers, without any tabs or ASCII strings. This 2D array of numbers is not required to be parsed by the containing application. Also, in general, a number of engineering formats exist for storing vectors or arrays. The Data Socket client preferably operates to convert data of these various formats into arrays of data or numbers for direct use by the application. After step 444, operation proceeds to step 460.

In step 460 the Flex Data object value in the Data Socket client is set. This means that the data which was converted into the more usable form in step 444, such as a 2d array, is now stored in memory managed by an object that is accessible by the client program. The client application may get a copy value from the Flex Data object by calling a method on the Flex Data object named "GetValue". This method preferably returns a copy of the value stored in a VARIANT, a structure defined by Microsoft as part of its ActiveX standard for component software. The Value of attributes can be gotten by calling a method named GetAttribute, or set by calling a method called SetAttribute. A VARIANT structure is used for attributes as well. The VARIANT structure can hold simple data types like numbers or Boolean values and data types that require additional memory for storage such as strings and arrays.

In step 462 the Data Socket client notifies the container or application that it has received a value from the data source, preferably through a new data event. Operation then completes.

If the Data Socket client does not include built-in support for the file type as determined in step 442, then in step 446 the Data Socket client determines if a Data Socket file adapter is registered for that file type. A Data Socket file adapter is created by a user and registered with the Data Socket. The Data Socket file adapter is used to read or write files using custom-defined formats. If a Data Socket file adapter is not registered for that type, then in step 490 the Data Socket client notifies the container or application that the value cannot be retrieved, and operation completes.

If a Data Socket file adapter is registered for that file type as determined in step 446, then in step 452 the Data Socket creates the file adapter component or client. In step 454 the Data Socket client calls or invokes the file adapter's Connect method. In step 456 the file adapter reads data from the file identified by the URL. In step 458 the file adapter constructs a Flex Data object with values and attributes extracted from the file.

After steps 452–458 have been performed, in step 460 Flex Data object value in the Data Socket client is set, and in step 462 the Data Socket client notifies the container or application that it has received a value from the URL, and operation completes.

If the access method is "dstp" as determined in step 430, then in step 432 the Data Socket client attempts to make a connection to the Data Socket server identified by the URL using the host name or Internet address encoded in the URL according to standard URL syntax. As described above, the access mode "dstp" directs the Data Socket client to connect to the Data Socket server identified in the URL. If the connection is established in step 432, then in step 434 the Data Socket client sends a command indicating a request to subscribe to a specific tag, or to write the value of a specific tag maintained by the Data Socket server. The Data Socket client preferably sends this command over TCP/IP. If the specific tag does not exist on the server, then the server may create the tag and give it an initial value, or may report back an error indicating that that the requested tag does not exist. This is a configuration option on the Data Socket server. Reporting errors is preferably done by sending commands over the TCP/IP connection. Commands are preferably sequences of bytes sent over a TCP/IP connection.

After step 434, as updates are received in step 436, the Data Socket client sets the value in the Data Socket's Flex Data object and notifies the container. Thus, each time update notifications are received from the server, the Flex Data object is set and the container or application is notified of each update. Step 436 is continually performed as data is received until the container instructs the Data Socket client to disconnect from the data source to which it is connected.

If the access method is not "dstp" as determined in step 430, and is not either http, ftp, or file as determined in steps 410 and 420, then in step 472 the Data Socket client derives or constructs the name of an extension or plug-in from the access method that was specified in the URL. For example, if the access method is "opc" then the name of the extension or plug-in could be "DataSocketPlugIn_opc".

In step 474 the Data Socket client determines if a Data Socket extension or plug-in with that name is registered. Thus, if the access method is not one of the pre-defined types, e.g., http, ftp, file, or dstp, in steps 472 and 474 the Data Socket client attempts to intelligently determine the proper extension or plug-in from the access method that was specified in the URL.

If no Data Socket plug-in is registered with the derived name, then the Data Socket client notifies the application or container that the value cannot be retrieved, and operation completes.

If a Data Socket plug-in is registered for the determined extension name as determined in step 474, then steps 476–482 are performed.

In step 476 the Data Socket client creates an extension component based on the registered Data Socket extension. In other words, the Data Socket client instantiates a component from the registered Data Socket extension.

In step 478 the Data Socket client calls the extension component's Connect method. In step 480 the extension or plug-in connects to the data source determined by the path and parameters in the URL. In step 482, when the data source has a value, the extension stores the value in a Flex Data object and operation then advances to 460. As discussed above, in steps 460 and 462 the Data Socket client's Flex Data object value is set and the Data Socket client notifies the container that it has received a value from the data source, and operation then completes.

Figure 11:
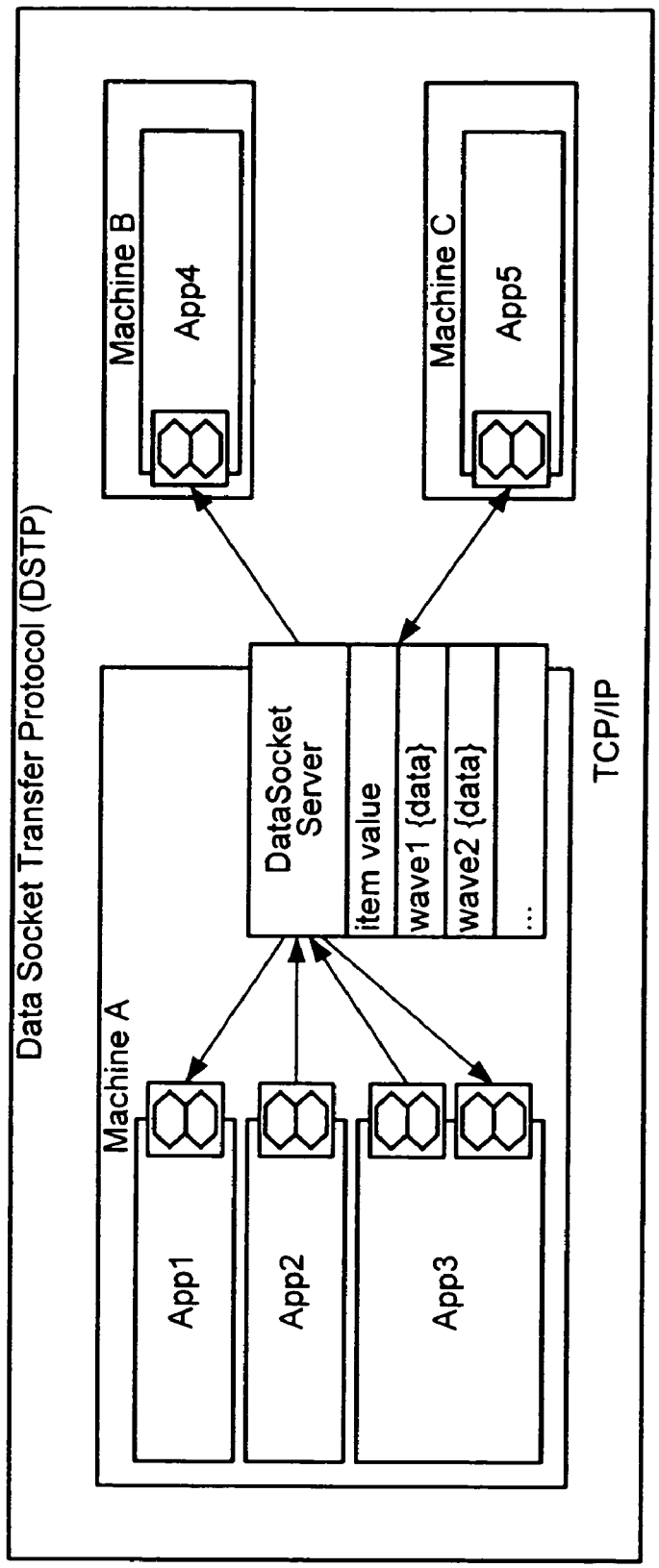
FIG. 11 illustrates operation of the Data Socket transfer protocol.

FIG. 11—Data Socket Transfer Protocol

When data is shared between two applications using Data Socket clients or tools, the data is preferably stored in an intermediate data server, referred to as a Data Socket server. In one embodiment of the present invention, URLs may be automatically generated to access available Data Socket servers. Such URLs begin with "dstp://" as the access method to signify that the Data Socket transfer protocol is to be used to send or receive data to/from the Data Socket server.

The Data Socket transfer protocol (DSTP) is a protocol to communicate between the Data Socket tools and the Data Socket server. In the preferred embodiment, the DSTP is based on the industry-standard TCP/IP protocol using a registered user port number 3015. A brief description of the protocol used in the preferred embodiment follows:

Message Formats:

All messages are made up of packets of bytes comprising the following parts.

1. [message_length] A 4-byte integer field (in little-endian) describes the length of the entire message in bytes, including the 4-byte header.

2. [message_format] A 2-byte enumeration that describes the binary format of the data in the message_data field. Types include 1,2,4,8 byte integers, 4 & 8 byte floating-point numbers, ASCII and UNICODE strings. There are two special enumeration values. The first, "array", is followed by a nested message whose type field describes the array element type. The second special enumeration value "cluster" is followed by a two byte count and then by series of nested messages each describing one element of data that follows in the message_data section.

3. [message_data] Optional data in the format identified by the second field. In the case of arrays and clusters, there may be more than one value.

Message Types:

Kinds of messages:

Messages are sent as a block of values stored in the "cluster" format described above. The first element is the op code, subsequent elements are parameters, if necessary, for the specific op code.

1. Greeting exchange, protocol version exchange.

2. Request from client to subscribe to an item maintained by the server. items are identified by a ASCII or UNICODE string.

3. Request from client to server to cancel any existing subscription on an item

4. Request from client to server to get an item's value

5. Request from client to server to set an item's value

6. Notification from server to client of an item's value. This may be in response to a subscription or a specific request for the value.

7. Notification from server to the client that the server is being shut down.

8. Notification from client to server that it is closing the connection. (This implies canceling any subscriptions made on the connection.)

Message opcodes:

Opcodes used:
  kCWDS_Connect,
  kCWDS_Disconnect,
  kCWDS_SetVersion,
  kCWDS_Logon,
  kCWDS Subscribe,
  kCWDS_Unsubscribe,
  kCWDS_SetValue,
  kCWDS GetValue, Message Sequences Sequences:

With the exception of the greeting messages, the client, or server never waits for a reply. Either the client or server can cancel the session at any time by sending the appropriate "disconnect" message.

Protocol functions:

Functions:

Getting, setting, and subscribing to values of items stored in a database maintained by a server.

Name of the port:

nati-dstp

Data Socket handles all tasks of converting data and data attributes from their native application format (strings, arrays, Booleans, etc.) into a TCP/IP suitable format, referred to as the Flex Data format, and converting back from the Flex Data format on the client end. Because the DSTP network communication only requires TCP/IP support, the Data Socket can be used to share information through many different types of networks, including the Internet. The Data Socket can be used to share information between machines located on opposite sides of the world using local Internet service providers. Of course, Data Socket and the Data Socket server can be used on a local Windows network or in a single stand-alone computer.

Data Socket Client—Instrumentation Applications

The Data Socket tools can be used to provide improved data access characteristics for instrumentation test and measurement, process control, and industrial automation applications. In effect, the Data Socket tools provide the user with a way to connect to measurements or data using a URL. In other words, the Data Socket system and method and the present invention together provide a standardized way for accessing all types of data using a convenient graphical user interface method. The basic components of a system which utilizes the Data Socket system and method include a Data Socket application, a Data Socket client, and one or more data sources or targets. The Data Socket client presents a measurement model for accessing data preferably including methods for connect/disconnect, configuration, triggering, and events referred to as on data changed and on status changed. The computer programs of the present invention may be used to automatically generate URLs referencing the one or more data sources/targets.

The Data Socket-enabled application can access various types of data including single points, waveforms, streaming data, or static data. Data sources/targets may also take various forms including protocols such as local files, http or ftp as well as formats including .wav, text and Flex Data.

The system also preferably includes Data Socket extensions or plug-ins which are used to map existing resources into a URL address base, these including DAQ, OPC (OLE for process control), IVI (interchangeable virtual instruments), IMAQ, and other user defined resources.

The system may further include Data Socket file adapters which users can add to support custom file formats. Data Socket file adapters are easy to write and allow users to separate file I/O from applications. Data Socket file adapters preferably use the file suffix or mime type to select a Data Socket extension.

Thus, the Data Socket system and method provides greatly improved connectivity between the plurality of data producers and data consumers. Applications are separated from I/O APIs, which greatly reduces programming time. In the instrumentation field, the Data Socket provides an established measurement model for acquiring data from any of various types of instruments or sources.

In the preferred embodiment, the computer programs of the present invention are used together with a Data Socket-enabled system. As described herein, the present invention automatically generates URLs identifying any of a variety of data sources/targets that may be connected to a computer. The URLs may then be provided to applications enabled to use them, such as Data Socket-enabled applications. Since the URLs are generated automatically, a user or application needs to know little or nothing about a data source/target or how to appropriately format a URL in order to access it. Thus, the present invention further abstracts the user and application from the I/O process.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer-implemented method for enabling access to one or more data sources or targets in a computer system, comprising:
   automatically determining one or more data sources or targets connected to the computer;
   automatically generating one or more URLs for each of the data sources or targets;
   wherein each of the URLs is useable for reading data from the respective data source or writing data to the respective data target.

2. The method of claim 1, wherein said data sources and targets include addressable data sources and targets of a hardware device physically coupled to the computer system.

3. The method of claim 1, wherein said automatically generating comprises including configuration information in one or more URLs; wherein the configuration information is operable to be used for configuring the respective data source or data target.

4. The method of claim 1, wherein said automatically generating comprises:
   querying a database to obtain information regarding a data source or data target;
   generating URLs based on the obtained information.

5. The method of claim 1, wherein one or more hardware devices are connected to the computer; wherein said automatically generating comprises:
   querying a database to obtain device information regarding one or more of the hardware devices, wherein said querying includes determining the addressable data sources and targets of the device(s);
   generating one or more URLs based on the device information and the addressable data sources and targets thus obtained.

6. The method of claim 5, wherein said device information includes device configuration information; wherein said generating comprises including device configuration information in one or more URLs identifying hardware device data sources or targets.

7. The method of claim 5, wherein the devices comprise one or more from the group consisting of: DAQ, GPIB, VXI, PXI, and serial.

8. The method of claim 5, wherein the computer system includes a first device of a first type and a second device of a second type;
   wherein said querying a database comprises querying a first database to obtain device information regarding the first device and querying a second database to obtain device information regarding the second device.

9. The method of claim 5, further comprising:
   connecting a new device to the computer;
   wherein said querying comprises obtaining device information regarding the new device, wherein said querying includes determining the addressable data sources and targets of the new device;
   wherein said URLs include one or more URLs for one or more addressable data sources and targets of the new device.

10. The method of claim 1, wherein at least one URL is operable to be included in an application program for reading data from a data source or writing data to a data target.

11. The method of claim 1, further comprising:
    providing one or more of the URLs to an application program, wherein the application program is operable to access the data source or data target identified by the URL.

12. The method of claim 11, wherein the application program includes a data socket client, wherein the data socket client uses the URL to connect to the data source or target identified by the URL and read data from it or write data to it.

13. The method of claim 1, further comprising:
    integrating the URLs with the computer operating system;
    wherein the URLs are accessible via a user interface.

14. The method of claim 13, wherein the URLs are operable to be provided to application programs via said user interface.

15. The method of claim 13, further comprising:
    editing the URLs using said user interface.

16. A system for enabling access to one or more data sources or targets, comprising:
    a computer system including a CPU and memory;
    one or more data sources or targets connected to the computer system;
    a URL generation manager comprised in the memory of the computer system which is executable to determine one or more of the data sources or targets and automatically generate one or more URLs for each of the determined data sources or targets;
    wherein each of the URLs is useable for reading data from the respective data source or writing data to the respective data target.

17. The system of claim 16, wherein the system further comprises:
    one or more hardware devices connected to the computer system; wherein said data sources and targets include addressable data sources and targets of a hardware device.

18. The system of claim 17, wherein the devices comprise one or more from the group consisting of: DAQ, GPIB, VXI, PXI, and serial.

19. The system of claim 16, wherein one or more of the generated URLs includes configuration information; wherein the configuration information is operable to be used for configuring the respective data source or data target.

20. The system of claim 16, wherein the system further comprises:
    one or more plug-in modules comprised in the memory of the computer system; wherein the plug-in modules interface with the URL generation manager; wherein each plug-in module is capable of automatically generating URLs to reference a particular type or class of data source or target.

21. The system of claim 20, wherein the system further comprises:
    one or more hardware devices connected to the computer system; wherein one or more of the plug-in modules is capable of automatically generating URLs to reference data sources or targets of a particular type or class of hardware device.

22. The system of claim 16, wherein the system further comprises:
    one or more databases which each store information regarding a particular type or class of data source or target, wherein said information includes information regarding the locations or addresses of one or more data sources or targets connected to the computer.

23. The system of claim 22, wherein said database information includes configuration information for one or more data sources or targets connected to the computer.

24. The system of claim 16, wherein the system further comprises:

one or more hardware devices connected to the computer system;
one or more databases which each store information regarding a particular type or class of hardware device, wherein said information includes device information regarding the locations or addresses of one or more device data sources or targets connected to the computer.

25. The system of claim 24, wherein said database device information includes device configuration information for one or more device data sources or targets connected to the computer.

26. The system of claim 16, wherein the system further comprises:
one or more databases which each store information regarding a particular type or class of data source or target, wherein said information includes information regarding the locations or addresses of one or more data sources or targets connected to the computer;
one or more plug-in modules comprised in the memory of the computer system; wherein each plug-in module interfaces with the URL generation manager; wherein each plug-in module obtains information from one or more of the databases regarding a particular type or class of data source or target; wherein each plug-in module is capable of automatically generating URLs to reference a particular type or class of data source or target.

27. The system of claim 16, wherein the system further comprises:
one or more hardware devices connected to the computer system;
one or more databases which each store information regarding a particular type or class of hardware device, wherein said information includes device information regarding the locations or addresses of one or more device data sources or targets connected to the computer;
one or more plug-in modules comprised in the memory of the computer system; wherein each plug-in module interfaces with the URL generation manager; wherein each plug-in module obtains information from one or more of the databases regarding a particular type or class of device data source or target; wherein each plug-in module is capable of automatically generating URLs to reference a particular type or class of device data source or target.

28. The system of claim 16, wherein the system further comprises computer programs executable to edit the generated URLs; wherein the URL information that is operable to be edited includes configuration information.

29. The system of claim 16, wherein the system further comprises an application program operable to receive a generated URL, and connect to the data source or target identified by the URL, and read data from it or write data to it.

30. The system of claim 29, wherein the application program includes a data socket client, wherein the data socket client uses the URL to connect to the data source or target identified by the URL and read data from it or write data to it.

31. A memory medium comprising program instructions which implement:
automatically determining one or more data sources or targets connected to a computer;
automatically generating one or more URLs for each of the data sources or targets;
wherein each of the URLs is useable for reading data from the respective data source or writing data to the respective data target.

32. The memory medium of claim 31, wherein said data sources and targets include addressable data sources and targets of a hardware device physically coupled to the computer.

33. The memory medium of claim 31, wherein the URLs are operable to be provided to an application program; wherein the application program is operable to connect to the data source or target identified by the URL, and read data from it or write data to it.

34. The memory medium of claim 33, wherein the application program includes a data socket client; wherein the data socket client uses the URL to connect to the data source or target identified by the URL and read data from it or write data to it.

35. The memory medium of claim 31,
wherein said automatically determining comprises determining device types of the one or more data sources or targets;
wherein said automatically generating operates to automatically generate the one or more URLs for each of the data sources or targets based on the device types.

36. The memory medium of claim 31,
wherein said automatically determining comprises determining a first device type of a first data source of the one or more data sources or targets;
wherein said automatically generating comprises:
automatically determining a first template for the first data source based on the first device type; and
automatically generating a first URL for the first data source based on the first template.

37. The memory medium of claim 31,
wherein said automatically determining comprises determining a first device type of a first data source of the one or more data sources or targets;
wherein said automatically generating comprises:
automatically determining a first template for the first data source based on the first device type;
automatically determining a first plug-in module for the first data source based on at least one of the first device type or the first template;
the first plug-in module automatically generating a first URL for the first data source based on the first template.

38. The memory medium of claim 31,
wherein said data sources and targets include one or more hardware devices physically coupled to the computer;
wherein said automatically determining comprises determining device types of the one or more hardware devices;
wherein said automatically generating operates to automatically generate the one or more URLs for each of the one or more hardware devices based on the device types.

39. The memory medium of claim 31,
wherein said data sources and targets include one or more hardware devices physically coupled to the computer;
wherein said automatically determining comprises identifying the one or more hardware devices;
wherein said automatically generating comprises:
querying a database to obtain information regarding the identified one or more hardware devices; and
automatically generating the one or more URLs for each of the one or more hardware devices based on the obtained information.

40. The memory medium of claim 31,
wherein the hardware device is a data acquisition device;
wherein the obtained information specifies a number of channels of the data acquisition device;
wherein said automatically generating comprises automatically generating at least one URL for each of at least a subset of the channels of the data acquisition device.

41. The memory medium of claim 40,
wherein the obtained information specifies characteristics of at least one channel of the data acquisition device;
wherein said automatically generating comprises including information regarding said characteristics in the URL for the at least one channel.

42. A memory medium comprising program instructions which implement:
automatically determining one or more hardware devices physically coupled to a computer system;
automatically generating one or more URLs for each of the determined one or more hardware devices;
wherein each of the URLs is useable for accessing data from the respective hardware device.

43. The memory medium of claim 42,
wherein said automatically determining determines a first hardware device, wherein the first hardware device comprises a plurality of data channels;
wherein said automatically generating comprises automatically generating URLs for each of the plurality of data channels.

44. The memory medium of claim 42,
wherein said automatically determining comprises determining device types of the one or more hardware devices;
wherein said automatically generating operates to automatically generate the one or more URLs for each of the one or more hardware devices based on the device types.

45. The memory medium of claim 42,
wherein said automatically determining comprises identifying the one or more hardware devices;
wherein said automatically generating comprises:
querying a database to obtain information regarding the identified one or more hardware devices; and
automatically generating the one or more URLs for each of the one or more hardware devices based on the obtained information.

46. The memory medium of claim 42, wherein the devices comprise one or more from the group consisting of: DAQ, GPIB, VXI, PM, and serial.

47. A memory medium, wherein the memory medium is operable to operate in a system comprising a computer system including a CPU and memory and one or more data sources or targets connected to the computer system, wherein the memory medium stores:
a URL generation manager which is executable to determine one or more of the data sources or targets and automatically generate one or more URLs for each of the determined data sources or targets;
wherein each of the URLs is useable for reading data from the respective data source or writing data to the respective data target.

48. The memory medium of claim 47,
wherein the one or more data sources or targets comprise one or more hardware devices physically connected to the computer system.

49. The memory medium of claim 48, wherein the devices comprise one or more from the group consisting of: DAQ, GPIB, VXI, PXI, and serial.

50. The memory medium of claim 47, wherein the memory medium further stores:
one or more plug-in modules, wherein the plug-in modules interface with the URL generation manager; wherein each plug-in module is capable of automatically generating URLs to reference a particular type of data source or target.

51. The memory medium of claim 47, wherein the memory medium further stores:
one or more databases which each store information regarding a particular type or class of data source or target, wherein said information includes information regarding the locations of one or more data sources or targets connected to the computer.

52. The memory medium of claim 51, wherein said database information includes configuration information for one or more data sources or targets connected to the computer.

53. The memory medium of claim 47, wherein the memory medium further stores:
one or more databases which each store information regarding a particular type of data source or target, wherein said information includes information regarding the locations of one or more data sources or targets connected to the computer;
one or more plug-in modules comprised in the memory of the computer system; wherein each plug-in module interfaces with the URL generation manager; wherein each plug-in module obtains information from one or more of the databases regarding a particular type of data source or target; wherein each plug-in module is capable of automatically generating URLs to reference a particular type of data source or target.

54. The memory medium of claim 47, wherein the system further comprises one or more hardware devices physically connected to the computer system;
wherein the memory medium further stores:
one or more databases which each store information regarding a particular type of hardware device, wherein said information includes device information regarding the locations or addresses of one or more device data sources or targets connected to the computer;
one or more plug-in modules, wherein each plug-in module interfaces with the URL generation manager; wherein each plug-in module obtains information from one or more of the databases regarding a particular type of device data source or target, wherein each plug-in module is capable of automatically generating URLs to reference a particular type or class of device data source or target.

55. The memory medium of claim 47, wherein the memory medium further stores an application program operable to receive a generated URL, connect to the data source or target identified by the URL, and perform at least one of read data from the data source or write data to the data target.

56. The memory medium of claim 55, wherein the application program comprises a data socket client, wherein the data socket client uses the URL to connect to the data source or target identified by the URL.

* * * * *

UNITED STATES PATENT AND TRADEMARK OFFICE
CERTIFICATE OF CORRECTION

| | | |
|---|---|---|
| PATENT NO. | : 7,152,116 B1 | Page 1 of 1 |
| APPLICATION NO. | : 09/374740 | |
| DATED | : December 19, 2006 | |
| INVENTOR(S) | : Austin et al. | |

It is certified that error appears in the above-identified patent and that said Letters Patent is hereby corrected as shown below:

In the Claims:

Column 29, Line 49, please delete "GPIB, VXI, PM, and serial.", and substitute --GPIB, VXI, PXI, and serial. --.

Signed and Sealed this

Sixth Day of March, 2007

JON W. DUDAS
*Director of the United States Patent and Trademark Office*